(12) United States Patent
Chahine et al.

(10) Patent No.: US 9,924,116 B2
(45) Date of Patent: Mar. 20, 2018

(54) TIME BASED OFFSET CORRECTION FOR IMAGING SYSTEMS AND ADAPTIVE CALIBRATION CONTROL

(71) Applicant: Seek Thermal, Inc., Santa Barbara, CA (US)

(72) Inventors: Romeo Chahine, Goleta, CA (US); William J. Parrish, Santa Barbara, CA (US); Jeffery Lee, Goleta, CA (US); Ross Williams, Santa Barbara, CA (US); Andreas Engberg, Santa Barbara, CA (US); Jason Wolfe, Santa Barbara, CA (US)

(73) Assignee: Seek Thermal, Inc., Santa Barbara, CA (US)

( * ) Notice: Subject to any disclaimer, the term of this patent is extended or adjusted under 35 U.S.C. 154(b) by 189 days.

(21) Appl. No.: 15/068,405

(22) Filed: Mar. 11, 2016

(65) Prior Publication Data
US 2016/0198102 A1    Jul. 7, 2016

Related U.S. Application Data

(63) Continuation-in-part of application No. 14/817,847, filed on Aug. 4, 2015.
(Continued)

(51) Int. Cl.
*H04N 5/33*    (2006.01)
*H04N 5/232*    (2006.01)
(Continued)

(52) U.S. Cl.
CPC .......... *H04N 5/33* (2013.01); *H04N 5/23241* (2013.01); *H04N 5/361* (2013.01); *H04N 5/3651* (2013.01);
(Continued)

(58) Field of Classification Search
CPC .... H04N 5/33; H04N 5/3653; H04N 5/23241; H04N 17/002; H04N 5/361; H04N 5/3651; H04N 5/2353
(Continued)

(56) References Cited

U.S. PATENT DOCUMENTS 5,200,623 A    4/1993    Cannata
6,140,948 A    10/2000   Yu
(Continued)

FOREIGN PATENT DOCUMENTS

EP    1 083 740    3/2001
EP    1 601 185    11/2005
(Continued)

OTHER PUBLICATIONS

PCT International Search Report and Written Opinion for PCT/US2015/032671 dated Sep. 7, 2015 in 16 pages.
(Continued)

*Primary Examiner* — Lin Ye
*Assistant Examiner* — Chan Nguyen
(74) *Attorney, Agent, or Firm* — Knobbe Martens Olson & Bear LLP

(57) ABSTRACT

A method and an imaging system for adaptive shutter control wherein an imaging system can be configured to actuate a calibration element at various times and develop an offset correction or Non-Uniformity Correction (NUC). The system control processing units may acquire information derived from calibration data, regular imaging data or external data, which may be correlated with how fast the NUC is changing over time. How often calibration element is actuated may be adaptively determined from the correlating information and the actuation times may be adaptively controlled to optimally actuate as needed. In some embodiments the calibration element may be a shutter and calibra-
(Continued)

tion activation may include closing the shutter and providing a flat field image for calibration purposes.

20 Claims, 13 Drawing Sheets

Related U.S. Application Data

(60) Provisional application No. 62/033,374, filed on Aug. 5, 2014.

(51) Int. Cl.
    *H04N 5/365* (2011.01)
    *H04N 5/361* (2011.01)
    *H04N 17/00* (2006.01)
    *H04N 5/235* (2006.01)

(52) U.S. Cl.
    CPC ......... *H04N 5/3653* (2013.01); *H04N 17/002* (2013.01); *H04N 5/2353* (2013.01)

(58) Field of Classification Search
    USPC .......................................................... 348/164
    See application file for complete search history.

(56) References Cited

U.S. PATENT DOCUMENTS

| | | | |
|---|---|---|---|
| 6,252,995 B1 | 6/2001 | Takamori | |
| 6,730,909 B2 | 5/2004 | Butler | |
| 6,757,442 B1 | 6/2004 | Avinash | |
| 7,795,578 B2 | 9/2010 | Högasten et al. | |
| 7,796,168 B1 | 9/2010 | Kostrzewa et al. | |
| 7,982,652 B2 | 7/2011 | Simony et al. | |
| 7,995,859 B2 | 8/2011 | Högasten | |
| 8,049,163 B1 * | 11/2011 | Granneman | G01J 5/522 250/252.1 |
| 8,189,050 B1 | 5/2012 | Hughes et al. | |
| 8,208,026 B2 | 6/2012 | Högasten et al. | |
| 8,208,755 B1 | 6/2012 | Högasten | |
| 8,306,275 B2 | 11/2012 | Högasten | |
| 8,340,414 B2 | 12/2012 | Högasten et al. | |
| 8,373,757 B1 | 2/2013 | Nguyen | |
| 8,378,290 B1 | 2/2013 | Speake et al. | |
| 8,428,385 B2 | 4/2013 | Whiteside et al. | |
| 8,737,760 B2 | 5/2014 | Olsson et al. | |
| 8,780,208 B2 | 7/2014 | Högasten et al. | |
| 9,332,186 B2 | 5/2016 | Johansson et al. | |
| 9,335,352 B2 | 5/2016 | McCrea et al. | |
| 2002/0022938 A1 | 2/2002 | Butler | |
| 2002/0074499 A1 | 6/2002 | Butler | |
| 2006/0092297 A1 | 5/2006 | Lee et al. | |
| 2006/0193509 A1 | 8/2006 | Criminisi | |
| 2007/0147698 A1 | 6/2007 | Reid | |
| 2009/0073278 A1 | 3/2009 | Ogawa et al. | |
| 2010/0141768 A1 | 6/2010 | Liberman et al. | |
| 2010/0238294 A1 | 9/2010 | Högasten et al. | |
| 2011/0141368 A1 | 6/2011 | Wallace et al. | |
| 2013/0064449 A1 | 3/2013 | Menikoff | |
| 2013/0147966 A1 | 6/2013 | Kostrzewa et al. | |
| 2013/0169819 A1 | 7/2013 | Strandemar | |
| 2013/0222604 A1 | 8/2013 | Ingerhed et al. | |
| 2013/0300875 A1 | 11/2013 | Strandemar et al. | |
| 2014/0015921 A1 | 1/2014 | Foi et al. | |
| 2014/0016879 A1 | 1/2014 | Högasten et al. | |
| 2014/0037225 A1 | 2/2014 | Högasten et al. | |
| 2014/0092257 A1 | 4/2014 | Högasten et al. | |
| 2014/0092258 A1 | 4/2014 | Dart et al. | |
| 2014/0168445 A1 | 6/2014 | Högasten et al. | |
| 2014/0247365 A1 | 9/2014 | Gardner et al. | |
| 2014/0313343 A1 | 10/2014 | Frank et al. | |
| 2014/0313385 A1 | 10/2014 | Sato et al. | |
| 2014/0355902 A1 | 12/2014 | Olsson | |
| 2014/0355904 A1 | 12/2014 | Olsson | |
| 2015/0187144 A1 | 7/2015 | Roth | |
| 2015/0310594 A1 | 10/2015 | Olsson | |
| 2015/0312488 A1 | 10/2015 | Kostrzewa et al. | |
| 2015/0312489 A1 | 10/2015 | Hoelter et al. | |
| 2015/0319379 A1 | 11/2015 | Nussmeier et al. | |
| 2015/0350567 A1 | 12/2015 | Parrish et al. | |
| 2016/0041039 A1 | 2/2016 | Olsson | |
| 2016/0042500 A1 | 2/2016 | Engberg et al. | |
| 2016/0044306 A1 | 2/2016 | Chahine et al. | |
| 2016/0056785 A1 | 2/2016 | Wolfe et al. | |
| 2016/0057369 A1 | 2/2016 | Wolfe et al. | |
| 2016/0061883 A1 | 3/2016 | Engberg et al. | |
| 2016/0156858 A1 | 6/2016 | Lee et al. | |
| 2016/0198102 A1 | 7/2016 | Chahine et al. | |
| 2016/0202117 A1 | 7/2016 | Hosking | |
| 2016/0203694 A1 | 7/2016 | Högasten et al. | |
| 2016/0323525 A1 | 7/2016 | Lee | |

FOREIGN PATENT DOCUMENTS

| | | |
|---|---|---|
| EP | 1667 066 | 6/2006 |
| EP | 2 618 560 | 7/2013 |
| EP | 2 645 577 | 10/2013 |
| WO | WO 2013/084809 | 6/2013 |
| WO | WO 2013/191611 | 12/2013 |
| WO | WO 2014/106210 | 7/2014 |

OTHER PUBLICATIONS

PCT International Search Report and Written Opinion for PCT/US042826 dated Oct. 16, 2015 in 12 pages.
PCT International Search Report and Written Opinion for PCT/US043547 dated Oct. 9, 2015 in 11 pages.
PCT International Search Report and Written Opinion for PCT/US045656 dated Oct. 21, 2015 in 12 pages.
Badamchizadeh, et al., Image and Graphics, Comparative Study of Unsharp Masking Methods for Image Enhancement, 2004, pp. 27-30.
PCT International Search Report and Written Opinion for PCT/US2015/063111 dated May 17, 2016 in 13 pages.
Dynamic-range compression and contrast enhancement in infrared imaging systems.
"The Integrator Amplifier," Electronics Tutorials, http://www.electronics-tutorials.ws/opamp/opamp_6.html, accessed Sep. 22, 2016.

* cited by examiner

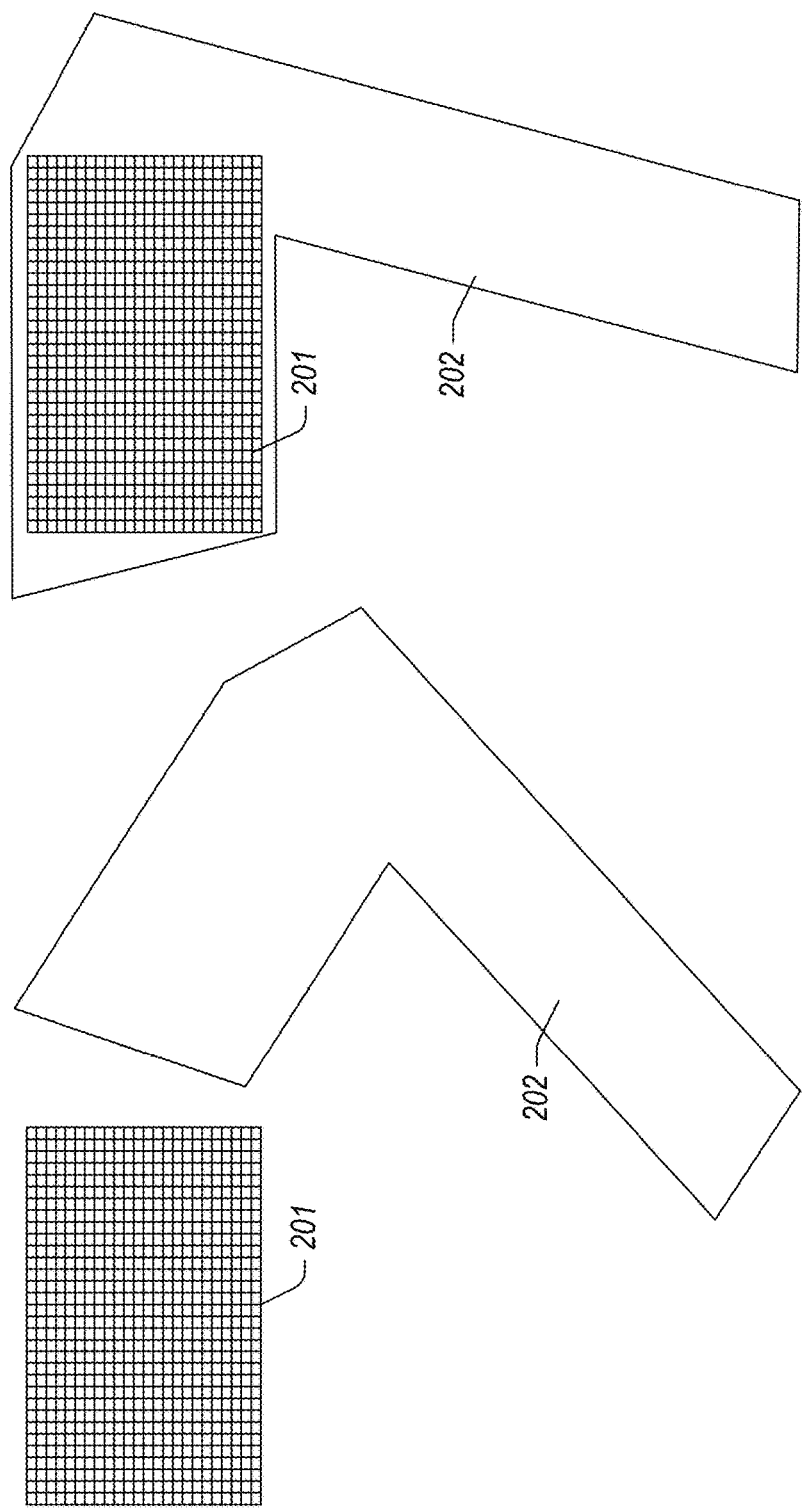

Example Array in a Kernal

|  | A1 |  |
|---|---|---|
| 33 | 26 | 44 |
| 34 | 24 | 49 |
| 38 | 29 | 41 |

Standard Deviation of Array    8

Average of Columns
Offset to normal to column 1

|  | B1 |  |
|---|---|---|
| 35 | 26 | 45 |
|  | 9 | -10 |

Vertically Flattened Array
Removing Low Frequency Content
A2 = A1 + B1

|  | A2 |  |
|---|---|---|
| 33 | 35 | 34 |
| 34 | 33 | 39 |
| 38 | 38 | 31 |

Standard Deviation of Array    3
with high Frequency Content Only

Noise Offsets
and Flat Field Correction
A3 = Ave(A1) - A2

|  | A3 |  |
|---|---|---|
| 2 | 0 | 1 |
| 1 | 2 | -4 |
| -3 | -3 | 4 |

Vertically Corrected Array
A4 = A1 + A3

|  | A4 |  |
|---|---|---|
| 35 | 26 | 45 |
| 35 | 26 | 45 |
| 35 | 26 | 45 |

TIME BASED OFFSET CORRECTION FOR IMAGING SYSTEMS AND ADAPTIVE CALIBRATION CONTROL

CROSS-REFERENCE TO RELATED APPLICATIONS

This application is a continuation-in-part of U.S. patent application Ser. No. 14/817,847, entitled "Time Based Offset Correction for Imaging Systems," filed Aug. 4, 2015, which claims the benefit of priority to U.S. Prov. Pat. App'n No. 62/033,374, entitled "Time Based Offset Correction for Imaging Systems," filed Aug. 5, 2014. Each of the applications referenced in this paragraph is incorporated by reference herein in its entirety.

BACKGROUND

1. Field

The present disclosure generally relates to adaptive calibration control for imaging systems, such as cameras including infrared cameras, and in particular to systems and methods for determining advantageous times to actuate a calibration element, such as closing a shutter, based on system information.

2. Description of Related Art

The increasing availability of high-performance, low-cost uncooled infrared imaging devices, such as bolometer focal plane arrays (FPAs), is enabling the design and production of mass-produced, consumer-oriented infrared (IR) cameras capable of quality thermal imaging. Such thermal imaging sensors have long been expensive and difficult to produce, thus limiting the employment of high-performance, long-wave imaging to high-value instruments, such as aerospace, military, or large-scale commercial applications. Mass-produced IR cameras may have different design requirements than complex military or industrial systems. New approaches to shutter and/or calibration control may be desirable for low-cost, mass-produced systems.

SUMMARY

Example embodiments described herein have innovative features, no single one of which is indispensable or solely responsible for their desirable attributes. Without limiting the scope of the claims, some of the advantageous features will now be summarized.

In some embodiments, an imaging system can be configured to actuate a calibration element at various times and develop an offset correction or Non-Uniformity Correction (NUC). The imaging system may acquire or derive information from calibration data, regular imaging data, or external data (e.g., from sensors) and this information may be correlated with a rate of change of the NUC. The imaging system can be configured to determine advantageous times to actuate the calibration element from the acquired or derived information. The imaging system can adaptively control the calibration element by determining these advantageous or optimal times to actuate the calibration element. In some embodiments, the calibration element may be a shutter. In such embodiments, calibration activation may include closing the shutter to provide a known scene or a flat field for calibration purposes.

In a first aspect, a method may be provided for adaptive calibration control in an imaging system including a calibration element, a Focal Plane Array (FPA) comprising an array of photodetectors, and detector electronic circuitry for reading out image data from the array of photodetectors, and one or more control processors, the method including: actuating the calibration element at one or more times under processor control to present a known scene to the array of photodetectors, and acquiring image data from the array of photodetectors, the image data including an array of pixel values representing the known scene; using the known scene image data to perform an offset correction (e.g., a Non-Uniformity Correction, (NUC)); acquiring image data at one or more times with the calibration element de-actuated; determining an estimated rate of change of the NUC based at least in part on information including one or more of calibration image data, scene image data, elapsed time data, or FPA ambient condition data; determining, based on the estimated rate of change of the NUC, at least one of an interval for actuating calibration element or a next calibration activation time or updating the NUC In some embodiments of the first aspect, the estimated rate of change of the NUC is based at least in part on a filter operation performed on image data. In some implementations of the first aspect, the filter may be a high-pass filter or a Fixed Pattern Noise (FPN) filter, and the information used to determine the estimated rate of change of the NUC may include the change in high spatial frequency noise over time due to changes in FPA ambient temperature inducing drift in FPA photodetector performance.

In some embodiments of the first aspect, FPA ambient temperature information is determined by acquiring data from one or more of an FPA temperature sensor, an imaging system temperature sensor whose output is related to FPA temperature, a known scene temperature sensor, or an imaging system temperature sensor sensing surrounding environment ambient temperature. In some embodiments of the first aspect, the estimated rate of change of the NUC is based at least in part on one or more of the acquired temperature difference over time or the rate of change of the acquired temperature.

In some embodiments of the first aspect, the method may include generating a predictive function of the NUC using the known scene data acquired at two or more calibration events wherein the NUC resulting from the predictive function is to be applied to image data acquired during scene imaging events that are subsequent to the two or more calibration events; using properties of the predictive function to determine the estimated rate of change of the NUC; and updating the predictive function based on subsequent calibration events. In some embodiments of the first aspect, the method may include updating the predictive function based on subsequent shutter closings.

In some embodiments of the first aspect, the estimated rate of change of the NUC is based at least in part on the rate of change of the predictive function. In some embodiments of the first aspect, elapsed time may be acquired from one or more of a real time clock or timer. In some embodiments of the first aspect, the calibration element is a shutter and the known scene is a flat field scene observed by the FPA when the shutter is closed.

In a second aspect, a system may be provided which may include an imaging FPA which may further include an infrared focal plane array; a calibration element configured to expose the FPA to a known scene when actuated; and one or more control processor elements including one or more of a signal processing element, a calibration element controller, a temperature acquisition element and a timer element, the processor configured to: actuate the calibration element at one or more times under processor control to present a known scene to the array of photodetectors; acquire image data from the array of photodetectors, the image data comprising an array of pixel values representing the known scene; Fuse the known scene image data to perform an offset correction (e.g., a Nona Uniformity Correction, (NUC)); acquire image data at one or more times with the calibration element de-actuated; determine an estimated rate of change of the NUC using information that includes one or more of calibration image data, scene image data, elapsed time data, or FPA ambient condition data; determine, based at least in part on the estimated rate of change of the NUC, at least one of interval for actuating calibration element or next calibration activation time or updating the NUC.

In some embodiments of the second aspect, the estimated rate of change of the NUC is based at least in part on a filter operation performed on image data. In some implementations, the filter may be a high-pass filter or a Fixed Pattern Noise (FPN) filter, and the estimated rate of change of the NUC is based at least in part on the change in high spatial frequency noise over time due to changes in FPA ambient temperature inducing drift in FPA photodetector performance.

In some embodiments of the second aspect, FPA ambient temperature information may be determined by acquiring data from one or more of an FPA temperature sensor, an imaging system temperature sensor whose output is related to FPA temperature, a known scene temperature sensor, or an imaging system temperature sensing surrounding environment ambient temperature. In some embodiments of the second aspect, the estimated rate of change of the NUC is based at least in part on one or more of the acquired temperature difference over time or the rate of change of the acquired temperature.

In some embodiments of the second aspect, the processor may be further configured to generate a predictive function of the NUC that is based at least in part on the known scene data acquired at two or more calibration events, wherein a NUC determine using the predictive function is to be applied to image data acquired at scene imaging events subsequent to the two or more calibration events; to determine the estimated rate of change of the NUC based at least in part on properties of the predictive function; and to update the predictive function based on subsequent calibration events. In some embodiments of the second aspect, the system may be further configured to update the predictive function based on subsequent shutter closings.

In some embodiments of the second aspect, the estimated rate of change of the NUC is based at least in part on the rate of change of the predictive function. In some embodiments of the second aspect, elapsed time may be acquired from one or more of a real time clock or timer. In some embodiments of the second aspect, the calibration element is a shutter and the known scene is the flat field observed by the FPA when the shutter is closed.

In some embodiments of the first and second aspects, the imaging system is a thermal imaging system.

BRIEF DESCRIPTION OF THE DRAWINGS

Aspects and advantages of the embodiments provided herein are described with reference to the following detailed description in conjunction with the accompanying drawings. Throughout the drawings, reference numbers may be re-used to indicate correspondence between referenced elements. The drawings are provided to illustrate example embodiments described herein and are not intended to limit the scope of the disclosure.

FIGS. 3A and 3B illustrate exemplary general operation of a shutter in an imaging system.

DETAILED DESCRIPTION

Figure 1A:
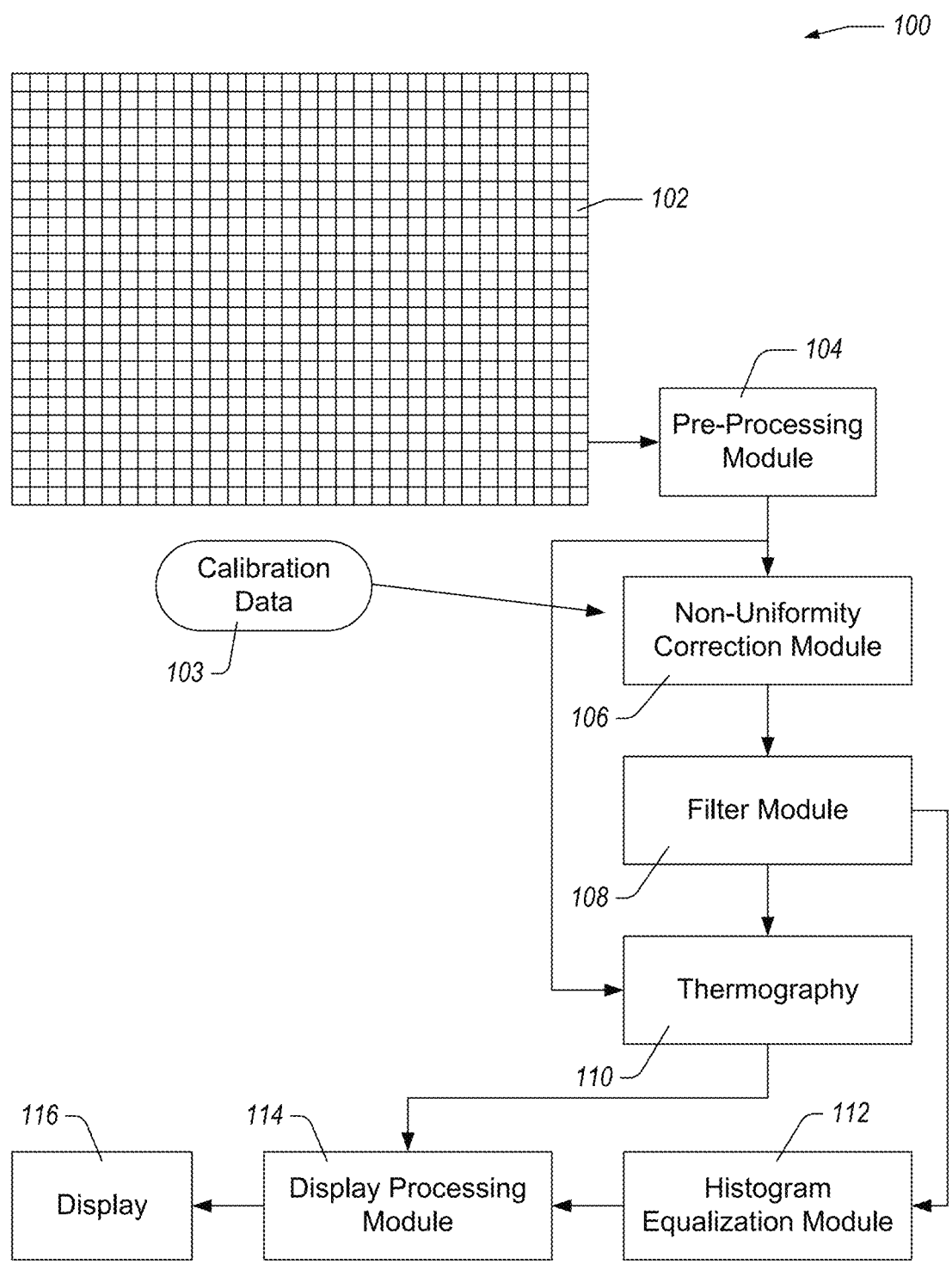
FIG. 1A illustrates a functional block diagram of an example imaging system.

Generally described, aspects of the present disclosure relate to calibration operations taking place during system operation as opposed to calibration at the manufacturing and test level, and specifically to in-operation calibration used to reduce or minimize the effects of time- and temperature-based drift of imaging system performance. These aspects relate to using known scene image data (e.g., image data acquired when an imaging system calibration element is activated) at different times to predict pixel offset values and to adjust image data using the predicted pixel offset values. This can be done to adjust for non-uniformities in pixel responses, for example. For many imaging systems, the in-operation calibration element is a shutter and the known scene is the flat field presented to the imaging array (e.g., FPA) when the shutter is closed. The present disclosure includes systems and methods to adjust image data to account for pixel offset values that change over time due at least in part to temperature changes at the imaging array. To account for these changing offset values, the systems and methods acquire flat field data at a plurality of times to determine a function that represents predicted offset drift of pixels over time. These systems and methods can use linear equations, quadratic equations, Lagrangian interpolation, or the like to characterize and to predict pixel offset values as a function of time. Thus, in some embodiments, these systems and methods can account for changing offset values without using an accurate temperature measurement or any temperature measurement at all. In some embodiments, an imaging system can account for changing offset values using a combination of measured temperature and time-based behavior. Due at least in part to the imaging system being able to characterize offset value drift as a function of time rather than or in addition to temperature, the imaging system can correct for offset drift without accurate temperature measurements and/or without using measurements from any temperature sensors. Advantageously, this can allow the imaging system to be built without temperature sensors configured to determine a temperature of the imaging array and/or associated components. Similarly, this can allow the imaging system to use relatively inexpensive temperature sensors with the imaging array. This can reduce manufacturing costs and/or complexity of the imaging system.

Other aspects of the present disclosure relate to using information derived from the known scene with the calibration element engaged, (e.g., flat field data acquired with the shutter closed), scene image data acquired with the calibration element disengaged (e.g., shutter open), information from sensors, information from timers, behavior of the predictive function or other information to predict or estimate the rate of change of the offset correction, which is also known as the Non-Uniformity Correction (NUC). Predicting or estimating the rate of change of the NUC allows for intelligent adaptive control of calibration element actuation (e.g., shutter closing). For example, the calibration element may be actuated less frequently when the estimated rate of change of the NUC is low. Less frequent actuations (e.g., shutter closings) may be advantageous in terms of less audible noise produced by the imaging system, lower power consumption, smoother imaging and longer system, lifetime.

Although examples and implementations described herein focus, for the purpose of illustration, on implementation in an infrared camera core using a focal plane array, the systems and methods disclosed herein can be implemented in digital and/or video cameras that acquire visible light using a variety of image sensors. Similarly, the imaging systems described herein can be implemented with different calibration systems (e.g., shuttering systems). Various aspects of the disclosure will now be described with regard to certain examples and embodiments, which are intended to illustrate but not limit the disclosure. For many of these aspects, the example embodiments will describe an imaging system where the calibration element is a shutter and the known scene used for calibration purposes is the flat field scene presented to the imaging array (e.g., FPA) when the shutter is closed. For the case of a thermal imaging system, the flat field with the shutter closed is substantially a flat temperature scene at or near the shutter temperature.

Some embodiments described herein provide offset corrections in image data that account for non-uniformities and drift in offset values of pixels caused at least in part by variations in temperature at an imaging array, where the offset corrections are advantageously applied without using a measured temperature of the imaging array. Advantageously, this allows the disclosed offset correction methods to be performed in systems that do not measure temperature of the imaging array. Advantageously, this allows the disclosed offset correction methods to be performed as a fail-safe or to provide redundancy in systems that utilize offset correction methods based on temperature measurements.

Some embodiments described herein provide an accurate offset correction for imaging arrays without temperature sensors or with inaccurate temperature sensors. Advantageously, the disclosed offset correction methods can be implemented in low-cost imaging systems that do not include temperature sensors or that include inexpensive and inaccurate temperature sensors.

Some embodiments described herein provide an offset correction process that is based on time instead of, or in addition to, temperature. Advantageously, imaging systems utilizing the disclosed offset correction methods can benefit from redundancy, fail-safes, and/or improved accuracy in offset correction processes by combining time-based and temperature-based methods.

Some embodiments described herein provide for adaptive control of closing of the calibration element (e.g., shutter) based at least in part on information that can be used to determine the rate of change of the NUC. If the rate of change of the NUC is known or can be inferred, an imaging system processor may be programmed to activate the calibration element (e.g., close the shutter) when needed rather than on a regular basis, leading to less frequent actuations (e.g., shutter closings) with no or little loss of imaging performance. Less frequent actuations (e.g., shutter closings) may be advantageous.

The disclosed offset correction and adaptive calibration control methods may be implemented as modules that may be a programmed computer method or a digital logic method and may be implemented using a combination of any of a variety of analog and/or digital discrete circuit components (transistors, resistors, capacitors, inductors, diodes, etc.), programmable logic, microprocessors, microcontrollers, application-specific integrated circuits, or other circuit elements. A memory configured to store computer programs or computer-executable instructions may be implemented along with discrete circuit components to carry out one or more of the methods described herein. In certain implementations, the disclosed methods may be implemented in conjunction with a focal plane array (FPA) on a camera core, wherein the processor and memory components executing the disclosed methods may be on a processing device mated to the camera core, such as a mobile appliance including smart phones, tablets, personal computers, etc. In some implementations, the processing and memory elements of the imaging system may be in programmable logic or on-board processors that are part of the core or camera system. In some embodiments, image frame acquisition, gain calibration, and bias or offset adjustment may be accomplished on a processing element on the camera core, and further image processing and display may be accomplished by a system controller mated to the core. In general, digital control functions, image acquisition, image processing, and image display/analysis may be distributed across one or more digital elements or processors. Referring to a system processor or any controller in any of the disclosed embodiments should not be interpreted as implying the control and processing functionality resides in a single element.

As a particular example of some advantages provided by the disclosed systems and methods, an imaging system can include a focal plane array (FPA) configured to acquire images of a scene. The FPA can include a two-dimensional array of N detectors, the FPA configured to output a two-dimensional image of the scene. For imaging purposes, image frames, typically data from all or some of the detectors $N_f$, are produced by the FPA, each successive frame containing data from the array captured in successive time windows. Thus, a frame of data delivered by the FPA comprises $N_f$ digital words, each word representing a particular pixel, P, in the image. These digital words are usually of a length determined by the analog to digital conversion (A/D) process. For example, if the pixel data is converted with a 14 bit A/D, the pixel words may be 14 bits in length, and there may be 16384 counts per word. For an IR camera used as a thermal imaging system, these words may correspond to an intensity of radiation measured by each pixel in the array. In a particular example, for a bolometer IR FPA the intensity per pixel usually corresponds to temperature of the corresponding part of the imaged scene, with lower values corresponding to colder regions and higher values to hotter regions. It may be desirable to display this data on a visual display.

Each pixel in an FPA may include a radiation detector that generates relatively small signals in response to detected radiation, such as in an infrared imaging array. These signals may be relatively small compared to signals or signal levels in the FPA arising from sources not caused by incident radiation, or non-image signals, wherein these non-image signals are related to the materials, structure, and/or components of the FPA. For example, pixels in an FPA can include interface circuitry including resistor networks, transistors, and capacitors on a readout integrated circuit (ROIC) that may be directly interfaced to the array of detectors. For instance, a microbolometer detector array, a microelectrical mechanical system (MEMS) device, may be manufactured using a MEMS process. The associated ROIC, however, may be fabricated using electronic circuit techniques. These two components can be combined together to form the FPA. The combination of the interface circuitry and the detector itself may have offset and temperature behaviors that are relatively large compared to the signals produced in response to incident radiation on the detectors. Thus, it is often desirable to compensate for these effects that are not related to the image signal before displaying or otherwise processing the image data.

Examples of image processing systems and methods are disclosed in U.S. patent application Ser. No. 14/829,500, filed Aug. 18, 2015, U.S. patent application Ser. No. 14/292,124, filed May 30, 2014, U.S. patent application Ser. No. 14/829,490, filed Aug. 18, 2015, U.S. patent application Ser. No. 14/817,989, filed Aug. 4, 2015, and U.S. Pat. App'n No. 817,847, filed Aug. 4, 2015, each of which is incorporated by reference herein in its entirety. These referenced applications describe a variety of imaging system configurations and various techniques for adjusting for artifacts and correcting for degradations in image quality that arise at least in part due to various properties and characteristics of the imaging systems. These various image processing functions may be accomplished in a processing unit, which, as described, may either be part of a camera device, a processing device interfaced to the camera device, and/or distributed between the two. The processing unit may include, for some imaging systems, control functions for operating a shutter.

Example Imaging Systems

FIG. 1A illustrates a functional block diagram of an example imaging system 100 comprising an image sensor such as a focal plane array 102, a pre-processing module 104, a non-uniformity correction module 106, a filter module 108, a thermography module 110, a histogram equalization module 112, a display processing module 114, and a display 116. The focal plane array 102 can output a sequence of frames of intensity data (e.g., images, thermal images, etc.). Each frame can include an array of pixel values, each pixel value representing light intensity detected by a corresponding pixel on the focal plane array 102. The pixel values can be read out of the focal plane array 102 as a stream of serial digital data. In some embodiments, the pixel values are read out of the focal plane array 102 using read out electronics that process whole rows or whole columns of the focal plane array 102. In some embodiments, the read out electronics outputs the data as a stream of a few columns or rows at a time. For instance some FPAs utilize a technique known as an electronic rolling shutter which activates the photodetectors during image acquisition in discrete increments, or sub-frames, of the total frame and outputs the sub-frames as they are acquired accordingly. Thus subsequent image processing may be configured to act on a sub-frame basis, working through the entire frame one or more sub-frames at a time. The format of the stream of data can be configured to conform to a desired, standard, or pre-defined format. The stream of digital data can be displayed as a two-dimensional image, such as by the display 116.

In some embodiments, the focal plane array 102 can be an array of microbolometers integrated with a readout integrated circuit ("ROIC"). The array of microbolometers can be configured to generate electrical signals in response to a quantity of thermal radiation or a temperature. The ROIC can include buffers, integrators, analog-to-digital converters, timing components, and the like to read the electrical signals from the array of microbolometers and to output a digital signal (e.g., 14-bit serial data separated into image frames). Additional examples of systems and methods associated with the focal plane array 102 are disclosed in U.S. patent application Ser. No. 14/292,124, entitled "Data Digitization and Display for an Imaging System," filed May 30, 2014, the entire contents of which is incorporated by reference herein.

The focal plane array 102 can have calibration or other monitoring information associated with it (e.g. calibration data 103) that can be used during image processing to generate a superior image. For example, calibration data 103 may include bad pixel maps, and/or gain tables stored in data storage and retrieved by modules in the imaging system 100 to correct and/or adjust the pixel values provided by the focal plane array 102. Calibration data 103 may include gain tables. As described herein, the focal plane array 102 can include a plurality of pixels with integrated readout electronics. The readout electronics can have a gain associated with it, wherein the gain may be proportional to the transimpedance of a capacitor in the electronics. This gain value, which may in some implementations take the form of a pixel gain table, may be used by the image processing modules of the imaging system 100. Additional examples of calibration data for the imaging system 100 are provided in U.S. patent application Ser. No. 14/829,490, entitled "Gain Calibration for an Imaging System," filed Aug. 18, 2015, the entire contents of which is incorporated by reference herein. The calibration data 103 can be stored on the imaging system 100 or in data storage on another system for retrieval during image processing.

The imaging system 100 includes one or more modules configured to process image data from the focal plane array 102. One or more of the modules of the imaging system 100 can be eliminated without departing from the scope of the disclosed embodiments, and modules not shown may be present as well. The following modules are described to illustrate the breadth of functionality available to the disclosed imaging systems and not to indicate that any individual module or described functionality is required, critical, essential, or necessary. Modules such as non-uniformity correction module 106, the filter module 108, the thermography module 110, and/or the histogram equalization module 112 may be collectively described as an "image processing chain."

The imaging system 100 includes the pre-processing module 104. The pre-processing module 104 can be configured to receive the digital data stream from the focal plane array 102 and to perform pre-processing functions. Examples of such functions include frame averaging, high-level frame-wide filtering, etc. The pre-processing module 104 can output serial digital data for other modules.

As an example, the pre-processing module 104 can include conditional summation functionality configured to implement integration and averaging techniques to increase apparent signal to noise in image data. For example, the conditional summation functionality can be configured to combine successive frames of digitized image data to form a digitally integrated image. This digitally integrated image can also be averaged to reduce noise in the image data. The conditional summation functionality can be configured to sum values from successive frames for each pixel from the focal plane array 102. For example, the conditional summation functionality can sum the values of each pixel from four successive frames and then average that value. In some implementations, the conditional summation functionality can be configured to select a best or preferred frame from successive frames rather than summing the successive frames. Examples of these techniques and additional embodiments are disclosed in U.S. patent application Ser. No. 14/292,124, entitled "Data Digitization and Display for an Imaging System," filed May 30, 2014, the entire contents of which is incorporated by reference herein.

As another example, the pre-processing module 104 can include adaptive resistor digital to analog converter ("RDAC") functionality configured to determine and/or adjust for operating bias points of the focal plane array 102. For example, for an imaging system that includes a shutter, the imaging system 100 can be configured to adjust an operating bias point of the detectors in the focal plane array 102. The adaptive RDAC functionality can implement an adaptive operating bias correction method that is based at least in part on periodic measurement of a flat field image (e.g., an image acquired with the shutter closed). The adaptive RDAC functionality can implement an ongoing adjustment of the operating bias based at least in part on a measured or detected drift over time of the flat field image. The bias adjustment provided by the adaptive RDAC functionality may provide compensation for drift over time of the photodetectors and electronics due to effects such as temperature changes. In some embodiments, the adaptive RDAC functionality includes an RDAC network that can be adjusted to bring measured flat field data closer to a reference bias level. Additional examples of systems and methods related to the adaptive RDAC functionality are provided in U.S. patent application Ser. No. 14/829,500, entitled "Adaptive Adjustment of the Operating Bias of an Imaging System," filed Aug. 18, 2015, the entire contents of which is incorporated by reference herein.

For a system such as the exemplary imaging system 100, adaptive calibration or shutter control may include elements present in the pre-processing module 104 or equivalent, as well as parts of the image processing chain.

Bad pixel replacement may be present as well, examples of which are described in U.S. Prov. App'n No. 62/297,669, entitled "Pixel Decimation for an Imaging System," filed Feb. 19, 2016, the entire contents of which is incorporated by reference herein. Bad pixel replacement functionality, which may include pixel decimation, may have access to a bad pixel map, which may be part of calibration data. In various implementations, bad pixels may be identified within image data by observing if given pixels are outside of pre-determined tolerances or vary from their neighbors by more than pre-determined thresholds.

After the pre-processing module 104, other processing modules can be configured to perform a series of pixel-by-pixel or pixel group processing steps. For example, the image processing system 100 includes a non-uniformity correction module 106 configured to adjust pixel data for gain and offset effects that are not part of the image scene itself, but are artifacts of the sensor. For example, the non-uniformity correction module 106 can be configured to receive a stream of digital data and correct pixel values for non-uniformities in the focal plane array 102. In some imaging systems, these corrections may be derived from actuation of an in-operation calibration element such as intermittently closing a shutter over the focal plane array 102 to acquire uniform scene data. From this acquired uniform scene data, the non-uniformity correction module 106 can be configured to determine deviations from uniformity. The non-uniformity correction module 106 can be configured to adjust pixel data based on these determined deviations. In some imaging systems, the non-uniformity correction module 106 utilizes other techniques to determine deviations from uniformity in the focal plane array. Some of these techniques can be implemented without the use of a shutter, and may use another type of in-operation element, and may rely on presenting known scenes to the imaging array as opposed to flat-field scenes. Some NUC techniques do not rely on physical calibration elements and use image processing techniques to derive a NUC. Additional examples of systems and methods for non-uniformity correction are described in U.S. patent application Ser. No. 14/817,847, entitled "Time Based Offset Correction for Imaging Systems," filed Aug. 4, 2015, to which the current application claims priority and the entire contents of which is incorporated by reference herein. These techniques are described in greater detail herein with reference to FIGS. 2A-7.

After the pre-processing module 104, the imaging system 100 can include a high/low $C_{int}$ signal processing functionality configured to receive a stream of digital data (e.g., 14-bit serial data) from the pre-processing module 104. The high/low $C_{int}$ functionality can be configured to process the stream of digital data by applying gain tables, for example, as provided in the calibration data 103. The high/low $C_{int}$ functionality can be configured to process the stream of digital data using output of high/low integration components. Such high/low integration components can be integrated with the ROIC associated with the focal plane array 102. Examples of the high/low integration components are described in U.S. patent application Ser. No. 14/292,124, entitled "Data Digitization and Display for an Imaging System," filed May 30, 2014, the entire contents of which is incorporated by reference herein.

The image processing system 100 includes a filter module 108 configured to apply one or more temporal and/or spatial filters to address other image quality issues. For example, the readout integrated circuit of the focal plane array can introduce artifacts into an image, such as variations between rows and/or columns. The filter module 108 can be configured to correct for these row- or column-based artifacts, as described in greater detail in U.S. patent application Ser. No. 14/702,548, entitled "Compact Row Column Noise Filter for an Imaging System," filed May 1, 2015, the entire contents of which is incorporated by reference herein. The filter module 108 can be configured to perform corrections to reduce or eliminate effects of bad pixels in the image, enhance edges in the image data, suppress edges in the image data, adjust gradients, suppress peaks in the image data, and the like.

For example, the filter module 108 can include bad pixel functionality configured to provide a map of pixels on the focal plane array 102 that do not generate reliable data. These pixels may be ignored or discarded. In some embodiments, data from bad pixels is discarded and replaced with data derived from neighboring, adjacent, and/or near pixels. The derived data can be based on interpolation, smoothing, averaging, or the like. For the case where pixel decimation with bad pixel replacement is desired, the bad pixel functionality may be placed earlier in the chain.

As another example, the filter module 108 can include thermal gradient functionality configured to adjust pixel values based on thermal gradients present in the image data but that are not part of the scene imaged by the imaging system 100. The thermal gradient functionality can be configured to use local flat scene data to derive data to improve image quality by correcting for thermal gradients produced in the imaging system 100. Examples of determining corrections for the thermal gradient functionality are described in greater detail in U.S. patent application Ser. No. 14/956,111, entitled "Image Adjustment Based on Locally Flat Scenes," filed Dec. 1, 2015, the entire contents of which is incorporated by reference herein.

The filter module 108 can include peak limit functionality configured to adjust outlier pixel values. For example, the peak limit functionality can be configured to clamp outlier pixel values to a threshold value.

The filter module 108 can be configured to include an adaptive low-pass filter and/or a high-pass filter, and/or a bandpass filter. In some embodiments, the imaging system 100 applies either the adaptive low-pass filter or the high-pass filter, but not both. The adaptive low-pass filter can be configured to determine locations within the pixel data where it is likely that the pixels are not part of an edge-type image component. In these locations, the adaptive low-pass filter can be configured to replace specific pixel data, as opposed to wider image area data, with smoothed pixel data (e.g., replacing pixel values with the average or median of neighbor pixels). This can effectively reduce noise in such locations in the image. The high-pass filter can be configured to enhance edges by producing an edge enhancement factor that may be used to selectively boost or diminish pixel data for the purpose of edge enhancement. Additional examples of adaptive low-pass filters and high-pass filters are described in U.S. patent application Ser. No. 14/817,989, entitled "Local Contrast Adjustment for Digital Images," filed Aug. 4, 2015, the entire contents of which is incorporated by reference herein. High-pass filter results, of the type described above, or in any form suitable for image processing functionality, may be employed as all or part of the information used for adaptive shutter control, as described herein with reference to FIG. 9.

The filter module 108 can be configured to apply optional filters to the image data. For example, optional filters can include, without limitation, averaging filters, median filters, smoothing filters, and the like. The optional filters can be turned on or off to provide targeted or desired effects on the image data.

The image processing system 100 includes a thermography module 110 configured to convert intensity to temperature. The light intensity can correspond to intensity of light from a scene and/or from objects in a field of view of the imaging system 100. The thermography module 110 can be configured to convert the measured light intensities to temperatures corresponding to the scene and/or objects in the field of view of the imaging system 100. The thermography module 110 can receive as input calibration data (e.g., calibration data 103). The thermography module 110 may also use as inputs raw image data (e.g., pixel data from the pre-processing module 104) and/or filtered data (e.g., pixel data from the filter module 108). Examples of thermography modules and methods are provided in U.S. patent application Ser. No. 14/838,000, entitled "Thermography for a Thermal Imaging Camera," filed Aug. 27, 2015, the entire contents of which is incorporated by reference herein.

The image processing system 100 includes a histogram equalization module 112, or other display conversion module, configured to prepare the image data for display on the display 116. In some imaging systems, the digital resolution of the pixel values from the focal plane array 102 can exceed the digital resolution of the display 116. The histogram equalization module 112 can be configured to adjust pixel values to match the high resolution value of an image or a portion of an image to the lower resolution of the display 116. The histogram, module 112 can be configured to adjust pixel values of the image in a manner that avoids using the limited display range of the display 116 on scene intensity values where there is little or no data. This may be advantageous for a user of the imaging system 100 when viewing images acquired with the imaging system 100 on the display 116 because it can reduce the amount of display range that is not utilized. For example, the display 116 may have a digital brightness scale, which for an infrared image corresponds to temperature where higher intensity indicates a higher temperature. However, the display brightness scale, for example a grey scale, is generally a much shorter digital word than the pixel sample words. For instance, the sample word of the pixel data may be 14 bits while a display range, such as grey scale, can be typically 8 bits. So for display purposes, the histogram equalization module 112 can be configured to compress the higher resolution image data to fit the display range of the display 116. Examples of algorithms and methods that may be implemented by the histogram equalization module 112 are disclosed in U.S. patent application Ser. No. 14/292,124, entitled "Data Digitization and Display for an Imaging System," filed May 30, 2014, the entire contents of which is incorporated by reference herein.

The imaging system 100 includes a display processing module 114 configured to prepare the pixel data for display on the display 116 by, for example, selecting color tables to convert temperatures and/or pixel values to color on a color display. As an example, the display processing module can include a colorizer lookup table configured to convert pixel data and/or temperature data into color images for display on the display 116. The colorizer lookup table can be configured to display different temperatures of a thermally imaged scene using different color display lookup tables depending at least in part on the relationship of a temperature of a given scene to a threshold temperature. For example, when a thermal image of a scene is displayed, various temperatures of the scene may be displayed using different lookup tables depending on their relationship to the input temperature. In some embodiments, temperatures above, below, or equal to an input temperature value may be displayed using a color lookup table, while other temperatures may be displayed using a grey scale lookup table. Accordingly, the colorizer lookup table can be configured to apply different colorizing lookup tables depending on temperature ranges within a scene in combination with user preferences or selections. Additional examples of functionality provided by a display processing module are described in U.S. patent application Ser. No. 14/851,576, entitled "Selective Color Display of a Thermal Image," filed Sep. 11, 2015, the entire contents of which is incorporated by reference herein.

The display 116 can be configured to display the processed image data. The display 116 can also be configured to accept input to interact with the image data and/or to control the imaging system 100. For example, the display 116 can be a touchscreen display.

The imaging system 100 can be provided as a standalone device, such as a thermal sensor. For example, the imaging system 100 can include an imaging system housing configured to enclose hardware components (e.g., the focal plane array 102, read out electronics, microprocessors, data storage, field programmable gate arrays and other electronic components, and the like) of the imaging system 100. The imaging system housing can be configured to support optics configured to direct light (e.g., infrared light, visible light, etc.) onto the image sensor 102. The housing can include one or more connectors to provide data connections from the imaging system 100 to one or more external systems. The housing can include one or more user interface components to allow the user to interact with and/or control the imaging system 100. The user interface components can include, for example and without limitation, touch screens, buttons, toggles, switches, keyboards, and the like.

In some embodiments, the imaging system 100 can be part of a network of a plurality of imaging systems. In such embodiments, the imaging systems can be networked together to one or more controllers.

Figure 1B:
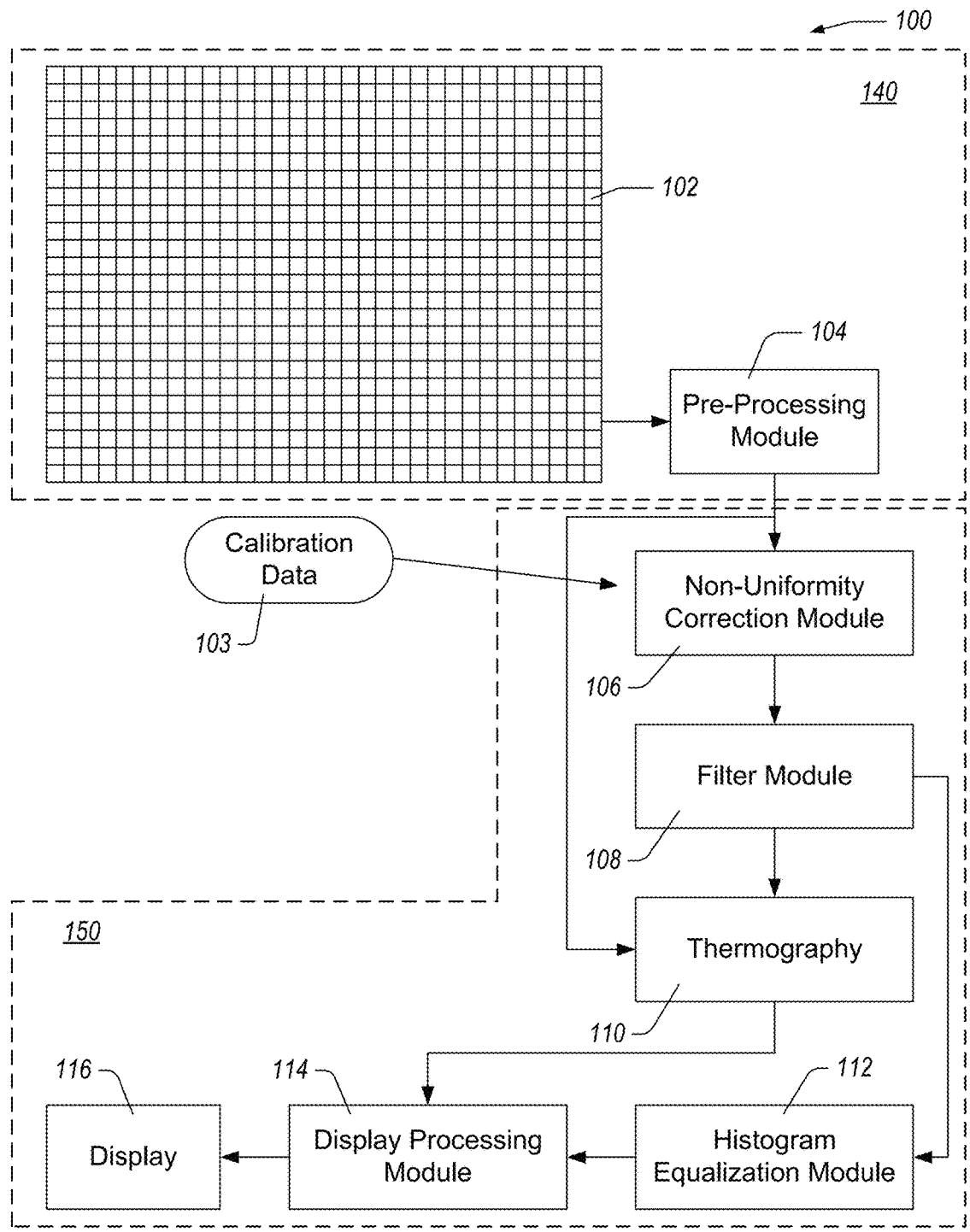
FIG. 1B illustrates a functional block diagram of the example imaging system illustrated in FIG. 1A, wherein functionality of the imaging system is divided between a camera and a mobile electronic device.

FIG. 1B illustrates a functional block diagram of the example imaging system 100 illustrated in FIG. 1A, wherein functionality of the imaging system 100 is divided between a camera or sensor 140 and, a processing device 150. Processing device 150 may be a mobile device or other computing device. By dividing image acquisition, pre-processing, signal processing, and display functions among different systems or devices, the camera 140 can be configured to be relatively low-power, relatively compact, and relatively computationally efficient compared to an imaging system that performs a majority or all of such functions on board. As illustrated in FIG. 1B, the camera 140 is configured to include the focal plane array 102 and the pre-processing module 104. In some embodiments, one or more of the modules illustrated as being part of the processing device 150 can be included in the camera 140 instead of in the processing device 150. In some embodiments, certain advantages are realized based at least in part on the division of functions between the camera 140 and the processing device 150. For example, some pre-processing functions can be implemented efficiently on the camera 140 using a combination of specialized hardware (e.g., field-programmable gate arrays, application-specific integrated circuits, etc.) and software that may otherwise be more computationally expensive or labor intensive to implement on the processing device 150. Accordingly, an aspect of at least some of the embodiments disclosed herein includes the realization that certain advantages may be achieved by selecting which functions are to be performed on the camera 140 (e.g., in the pre-processing module 104) and which functions are to be performed on the processing device 150 (e.g., in the thermography module 110).

An output of the camera 140 can be a stream of digital data representing pixel values provided by the pre-processing module 104. The data can be transmitted to the processing device 150 using electronic connectors (e.g., a micro-USB connector, proprietary connector, etc.), cables (e.g., USB cables, Ethernet cables, coaxial cables, etc.), and/or wirelessly (e.g., using BLUETOOTH, Near-Field Communication, Wi-Fi, etc.). The processing device 150 can be a smartphone, tablet, laptop, computer or other similar portable or non-portable electronic device. In some embodiments, power is delivered to the camera 140 from the processing device 150 through the electrical connectors and/or cables.

The imaging system 100 can be configured to leverage the computing power, data storage, and/or battery power of the processing device 150 to provide image processing capabilities, power, image storage, and the like for the camera 140. By off-loading these functions from the camera 140 to the processing device 150, the camera can have a cost-effective design. For example, the camera 140 can be configured to consume relatively little electronic power (e.g., reducing costs associated with providing power), relatively little computational power (e.g., reducing costs associated with providing powerful processors), and/or relatively little data storage (e.g., reducing costs associated with providing digital storage on the camera 140). This can reduce costs associated with manufacturing the camera 140 due at least in part to the camera 140 being configured to provide relatively little computational power, data storage, and/or power, because the imaging system 100 leverages the superior capabilities of the processing device 150 to perform image processing, data storage, and the like.

Example Imaging System Configured to Acquire Flat Field Images

Figure 2A:
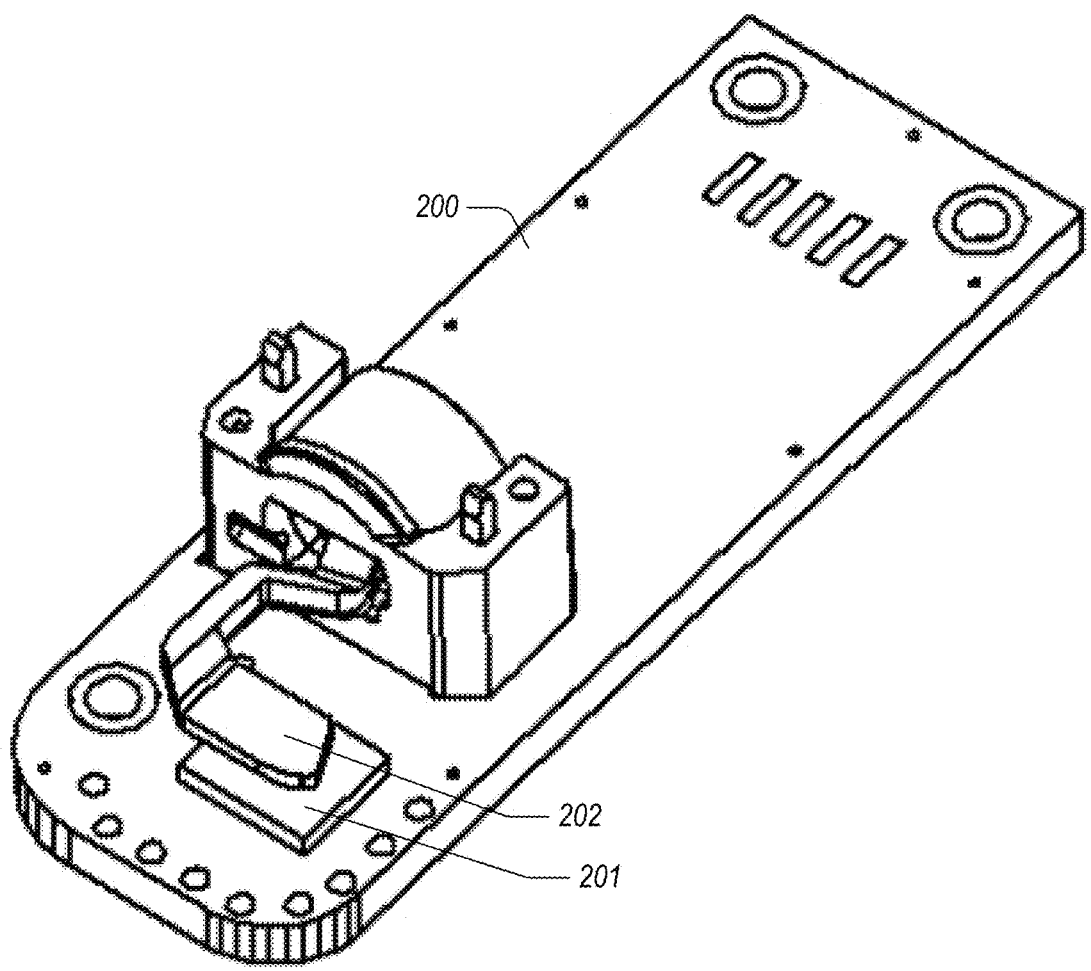
FIGS. 2A and 2B illustrate an example embodiment of an infrared camera core.
Figure 2B:
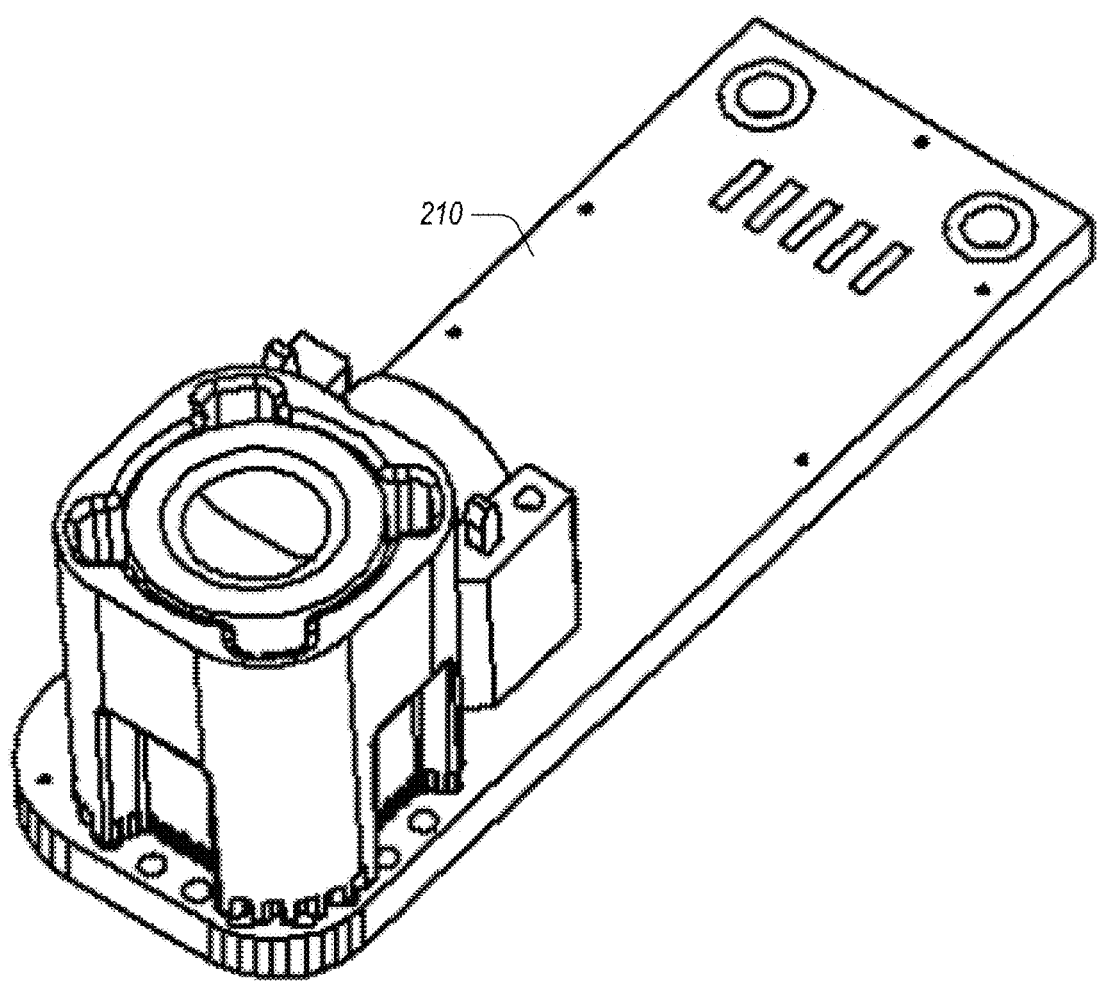

FIGS. 2A and 2B illustrate an exemplary camera core, utilizing a shutter as an in-operation calibration element, the camera core 200 being partially assembled (as illustrated in FIG. 2A) and the camera core 210 being a fully assembled core. A focal plane array (FPA) 201 is positioned on the core 200 relative to shutter 202, such that the shutter 202 can be actuated to expose and to occlude the FPA 201. Various interface electronics may be part of the camera core 200 or part of a controller mated to the core 200.

FIGS. 3A and 3B illustrate an example shutter 202 and an example FPA 201, with the shutter 202 exposing the FPA 201 (illustrated in FIG. 3A) and occluding the FPA 201 (illustrated in FIG. 3B). When the shutter 202 occludes the FPA, the shutter 202 can be said to be closed. In the closed position, the shutter 202 can be configured to cover the entire field of view of the FPA 201. In the closed position, image data can be acquired by the FPA 201. This acquired image data with the shutter 202 closed can be equivalent or similar to a flat field image of a dark field of view for a visible light imaging system or a cooled infrared imaging system. For an uncooled IR imager, images acquired with the shutter 202 closed may be equivalent to a flat field image at a temperature of the shutter 202.

Flat field scenes and images can be used to determine compensation factors for different gains and/or dark currents for pixels in an imaging system and/or to correct for non-uniformities in the imaging system. In general, a flat field scene can generally refer to a substantially uniform scene provided for an imaging sensor for the purposes of determining non-uniformities in the imaging sensor. Similarly, a flat field image can generally refer to image data of a flat field scene. A dark flat field scene or dark flat field image, or similarly a flat field image of a dark scene or field of view, can generally refer to a flat field scene that is substantially free of light. A flat field of a dark field of view can be used in a visible light imaging system and/or a cooled infrared imaging system to determine dark currents in pixels in an imaging array (e.g., currents or signals in pixels with no light incident on the pixels). For an uncooled infrared imager, the shutter 202 may radiate infrared light with an intensity corresponding to a temperature of the shutter 202. Thus, with the shutter 202 closed for an uncooled infrared imager, images acquired with the shutter 202 closed are generally not flat field images of a dark field of view, but are flat field images with incident light intensity corresponding to a temperature of the shutter 202. A flat field image can be used to determine non-uniformities by determining pixel-to-pixel variations because ideally the pixels in a flat field image should have approximately the same values. Similarly, a flat field image of a dark field of view can be used to determine pixel dark, currents because ideally pixel intensity values should be substantially equal to 0 where there is no incident radiation. Correction factors can be determined to adjust pixel values to account for dark pixel currents and/or non-uniformities between pixels. These correction factors can then be applied to images acquired with the shutter open, thereby compensating for pixel offset values, pixel dark currents, pixel non-uniformities, or any combination of these.

As described herein, non-image signals can contribute significantly to signals readout from pixels in some imaging arrays. These non-image signals can be correlated to a temperature of the imaging array. For uncooled infrared imagers, in certain implementations, images acquired with the shutter 202 in the closed position can be approximated as flat field images with an intensity corresponding to the temperature of the shutter 202. The correction factors, such as pixel offset values, determined using these flat field images thus incorporate the temperature of the imaging array due at least in part to the temperature of the shutter 202 behaving similarly to the temperature of the imaging array. For example, changes in the temperature of the shutter 202 track changes in the temperature of the imaging array. Thus, using flat field images with the shutter 202 closed in uncooled infrared imagers allows for correction factors to be determined that are affected by temperature in a way that is similar to images of scenes (e.g., images acquired with the shutter 202 open).

To determine non-uniformity correction factors, such as pixel offset values, a frame (or multiple frames) of image data may be acquired with the shutter 202 closed. The acquired image data from each pixel may be used by various signal processing techniques to improve the quality of frames of image data acquired with the shutter 202 open. The acquired image data with the shutter 202 closed can provide information used to correct or compensate for drift and offset effects in the imaging array on a pixel-by-pixel basis. Typically, shutter-based data correction is used in infrared imagers where the signals dependent on detected radiation are often small compared to bias voltages, pixel signal drifts, and/or pixel-to-pixel non-uniformities. The systems and methods disclosed herein may be beneficial, in particular, to imaging systems sensitive to light in the visible portion of the spectrum, such as those imaging systems used in photometry or low-light applications.

In an ideal imaging system, pixel offset values would be determined and known for each frame of image data acquired. However, it may not be practical or beneficial to constantly monitor pixel offset values. For example, determining non-uniformity corrections can involve closing the shutter and it is usually desirable to operate the shutter as infrequently as practicable to maintain image quality. Closing the shutter may interrupt imaging, for example, as well as use power and make audible noise. Therefore it is often desirable use the shutter sparingly and/or during specific limited times, such as a calibration cycle, to acquire some offset data and then to extrapolate that data to predict offsets. This can result in accurate offset data applicable for relatively long periods of time using the imaging system without requiring frequent shutter closures to image the flat field.

However, as described herein, offset errors in some imaging systems may be significantly affected by the temperature of the imaging array, such as the temperature of the FPA. Accordingly, the systems and methods disclosed herein can be configured to determine pixel offset values more frequently when it is likely that the temperature will change fairly rapidly and less frequently when it is likely that the temperature is relatively stable. For example, temperature changes affecting pixel offset values may be more pronounced during a period just after the imaging system is powered up (warm-up time), and then may settle down as the temperature of the imaging system stabilizes. Similarly, changes in ambient temperature, such as taking an imaging system from an indoor location to an outdoor environment, may also affect pixel offset values. Accordingly, during startup the imaging system can be configured to determine pixel offset values relatively frequently (e.g., once over one second or few seconds, once every 30 frames, once every 60 frames, etc.) and can then reduce the frequency of shutter closures to once every minute or once every few minutes. Similarly, the imaging system can be configured to determine or update pixel offset values when a change in temperature has been detected, such as a change in temperature above a tailored threshold.

As described herein, the majority of the change in pixel offset values may be due to temperature changes at the imaging array. To correlate changes in pixel offset values with temperature changes, an FPA can have a built-in temperature sensor on the readout and/or detector array substrates. When flat field measurements are made, for example, these measurements can be correlated with the measured temperature value from the temperature sensor. A number of flat field data sets may be acquired at different temperatures, either during manufacture and test of the imager and/or periodically during use. This information can be used to determine functions that characterize the pixel offset values as a function of measured temperature. However, on-chip temperature sensors may not be desirable or sufficiently accurate in some imaging systems. The temperature sensors themselves may add to circuit complexity, size, and power consumption, which may be disadvantageous for certain imaging systems. Furthermore, temperature sensors may also drift over time. Particularly, for low-cost, mass-produced devices, accurate and dependable temperature measurements may not be practical. Thus, the systems and methods disclosed herein can advantageously be configured to predict offset variations without the use of temperature measurements.

Examples of Determining Pixel Offset Values as a Function of Time

Figure 4:
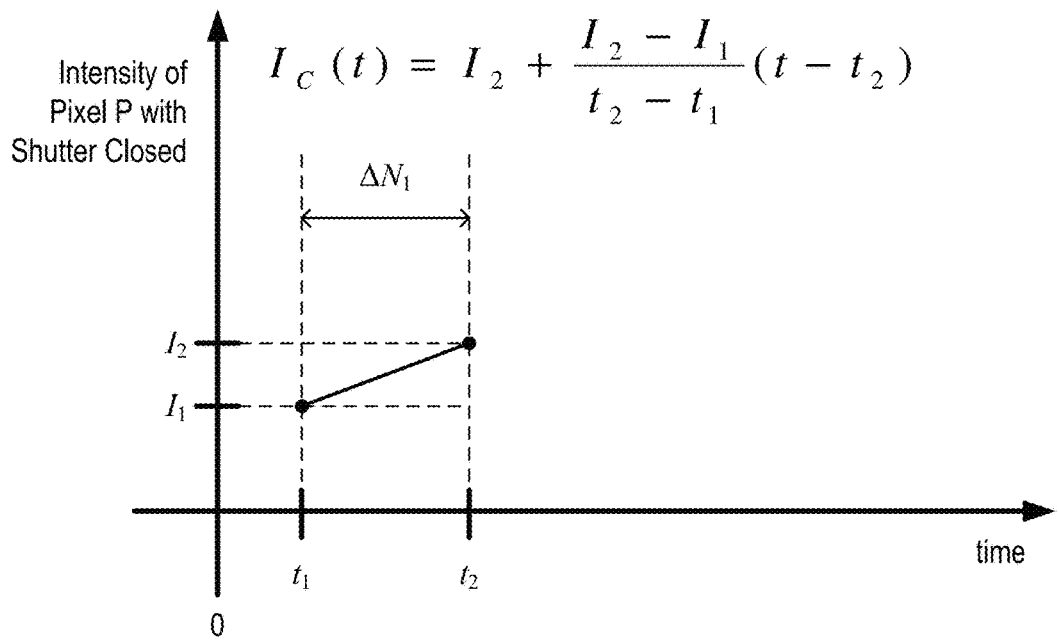
FIGS. 4-6 illustrate examples of determining offset values for a pixel to predict and to account for changes in the offset value over time.
Figure 5:
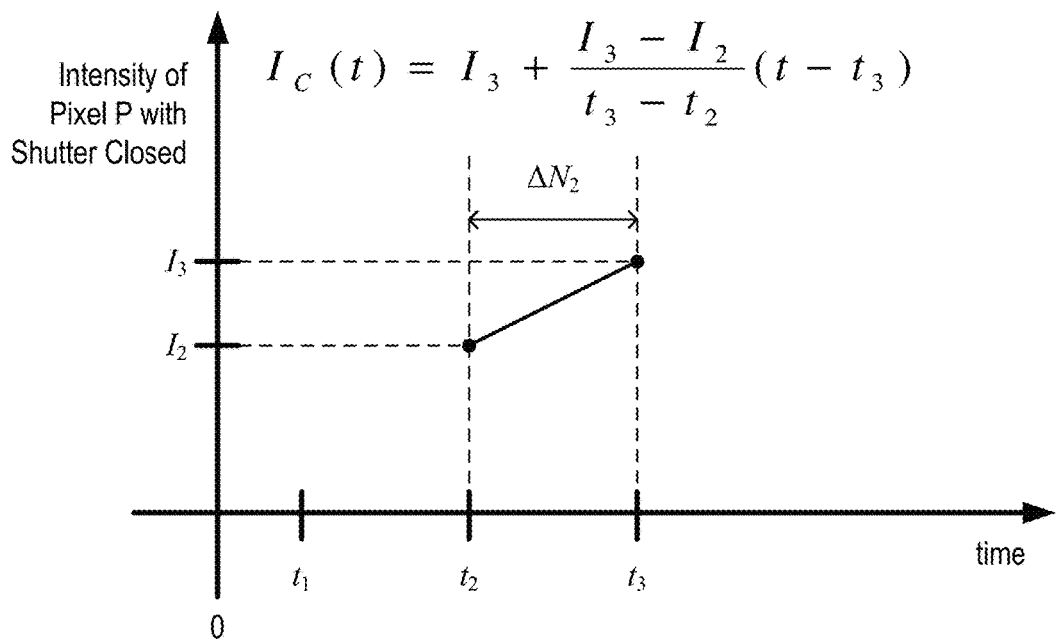
Figure 6:
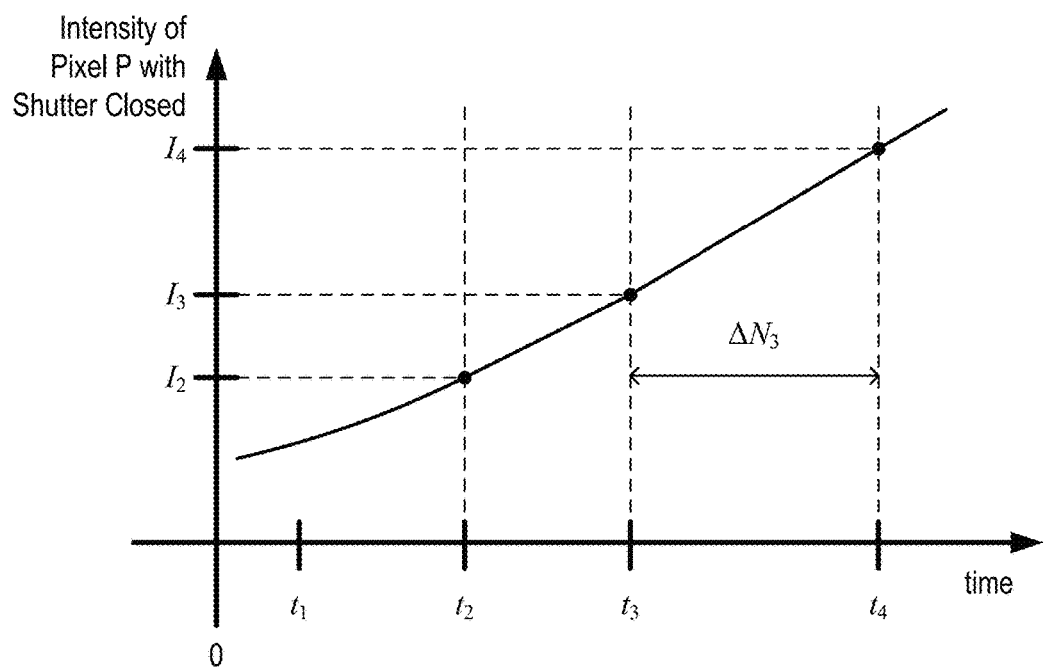

FIGS. 4-6 illustrate examples of determining offset values for a pixel to predict and to account for changes in the offset value over time. As used herein, the offset values can refer, in general, to pixel values that are offset from a uniform response when acquiring flat field data. The uniform'response can be determined in a number of ways, such as averaging pixel values in flat field data or the like. In contrast to correlating measured flat field data with measured temperature, two or more flat field data sets can be acquired at known times to determine a pixel-by-pixel function of time that is predictive of offset value changes over time. It may be advantageous to use a function of time rather than temperature due at least in part to imaging systems being able to accurately the time between acquired data. For instance, the frame rate of an imaging system may be highly accurate and repeatable.

A variety of different functions may be used to characterize the offset drift as a function of time on a pixel-by-pixel basis. For example, the function can depend at least in part on the number of data points being used to determine the function. In certain implementations, a linear function can be used where there are two or more data points and a quadratic function can be used where there are three or more data points. In various implementations, Lagrange interpolation techniques can be used to extrapolate pixel offset values based on two or more data points. In some embodiments, the function type (e.g., linear vs. quadratic) can be based on differing numbers of data points and/or on where the imaging system is in its operating cycle.

With reference to FIG. 4, the time axis starts at power-on of an imaging system. At a time $t_1$ the shutter is closed and a frame of flat field data is acquired, represented on the graph as $I_1$, the intensity measured for a given pixel at a first time, $t_1$. In some embodiments, the first flat field data set may be acquired after a relatively short time after power-on (e.g., about 30 frames). After another relatively short time period (e.g., about 30 frames), represented as $\Delta N_1$, a second flat field frame is acquired, $I_2$, at a second time, $t_2$. At this point, a linear function of time can be produced, an illustrative example of which is the formula shown in FIG. 4. The offset value function, $I_c(t)$, produces a predictive offset correction value, $I_c$, which is a function of time, t, for each pixel. Any image data acquired with the shutter open after the second time, $t_2$, can be adjusted using a predictive offset correction value, $I_c$, calculated for each pixel as a function of the time the image data is acquired. This value can be used to adjust the image data to compensate for pixel offset drift and variation or non-uniformity of the pixels. The collection of offset value functions for the pixels in the imaging array represents a prediction of flat field data at a time, t, later than the time $t_2$. In some embodiments, the predicted flat field data (e.g., the set of predicted pixel offset values at a particular time) is subtracted from the image data as an offset correction or the predicted flat field data can be normalized before using it to adjust acquired image data. For example, an average pixel value can be determined for a flat field image. For each pixel, deviation from the average can be determined as the offset value for that pixel. As another example, the average pixel value calculated for a flat field image can be used to normalize pixel offset values. In some embodiments, the imaging system can be configured to not display image data acquired with the shutter open until after $t_2$ and initial offset correction functions are produced and used. In some embodiments, if $t_2$ is on the order of about 60 frames after start-up, a few seconds may elapse before an image is displayed. In certain embodiments, an initial flat field data set is acquired and used as an estimate of the pixel offset values (e.g., the initial flat field data set is used to adjust image data of a scene) until a second flat field data set is acquired and an offset value function is produced.

With reference to FIG. 5, after another time period, $\Delta N_2$, which again may be relatively short (e.g., about 30 frames), the shutter can be closed again and another flat field data set, $I_3$, can be acquired at time $t_3$. In the illustrative example, another linear equation is fit to points $I_3$ and $I_2$, and an example formula is derived, as shown in FIG. 5. For subsequent image data of a scene (e.g., images acquired with the shutter open after time $t_3$), the offset value function per pixel, $I_{c,i}$, determined using the most recent flat field data set is used to adjust pixel values to derive adjusted image data, $P_a$. The offset value function, $I_c$, may be updated over time by intermittently closing the shutter and acquiring flat field data sets while the shutter is closed. When image data of a scene is acquired, the most recent offset value functions can be used to adjust the image due at least in part to the offset value function predicting pixel offset drift as a function of time. FIGS. 4 and 5 illustrate the function $I_c(t)$ as being a linear fit to two consecutive measurements (e.g., $I_n$ and $I_{n+1}$). However, any two data points may be used, including consecutive or non-consecutive data points (e.g., $I_n$ and $I_{n+2}$). Furthermore, more than two data points may be used to determine the offset value function.

Using a linear equation for the offset value function may be suitable for the first few seconds of operation as well as to represent long term behavior as well. It has been observed that once an exemplary microbolometer FPA stabilizes, it is sufficient to acquire flat, field data on, the order of once every few minutes to update the offset value function. In some embodiments, the offset value function can be updated every few seconds for a few minutes after powering up the imaging system, and then reduced to a rate of once every few minutes thereafter. In certain embodiments, for an imaging system with intelligent control, the rate at which the imaging system acquires flat field data to update the offset value function can vary depending on operational parameters. For example, the rate can be adjusted by examining the change, or average changes over all pixels, between the most recent flat field data set and the previous flat field data set. If the change exceeds a threshold, the rate can increase, for example. In some embodiments, the imaging system can monitor the change in temperature and trigger acquisition of flat field data if the change in temperature exceeds a threshold. Similarly, if the change in temperature or the rate of change of temperature is exceeds temperature thresholds, the rate at which flat field data is acquired can be adjusted. Other methods for keying acquisition of flat field data or modifying the rate of acquisition of flat field data can be used. For example, if the time since the last acquired flat field data exceeds a threshold, then another flat field data set can be acquired. As another example, if the time since the last acquired flat field data exceeds and threshold and a temperature change exceeds a temperature change threshold, then another flat field data set can be acquired and/or the rate of acquisition of flat field data can increase. As another example, the time since power-up can be monitored, and a first set of rules can be applied during a first period after startup and a second set of rules can be applied after the first period. Additional periods may be used as well.

As illustrated in FIG. 6, after another time period, $\Delta N_3$, which may be a longer period than the previous two time periods $\Delta N_1$ and $\Delta N_2$ (e.g., $\Delta N_3$ is about 60 frames), it may be appropriate to change the offset value function, $I_c(t)$, to be non-linear. For example, the function can be a quadratic equation fit to data points $t_2$, $t_3$, and $t_4$, as shown by the example formula in FIG. 6. In certain implementations, Lagrangian interpolation techniques may be used to determine the offset value function. At this point it may be acceptable to leave the shutter open for a longer period of time before acquiring the next flat field data set.

In some embodiments, higher order equations may be used on consecutive or non-consecutive data sets. An exemplary formula for a quadratic fit to three points is shown in FIG. 6, but other functions configured to fit three or more data points may also be used.

An imaging system, such as the imaging system 100 described herein with reference to FIGS. 1A and 1B, can be configured to adjust acquired image data based at least in part on estimated offset values for pixels in the image data. This adjustment can be performed as part of a signal processing chain comprising one or more signal processing modules, such as the modules described herein with reference to FIGS. 1A and 1B. For example, the non-uniformity correction module 106 described herein, with reference to FIGS. 1A and 1B can be configured to apply an updated offset value function to adjust image data to account for pixel drift over time. In some embodiments, the non-uniformity correction module 106 can determine the offset value function by analyzing two or more sets of image data acquired when a shutter occludes an imaging sensor. In some embodiments, the non-uniformity correction module 106 retrieves the offset value function from data storage or physical memory.

Figure 7:
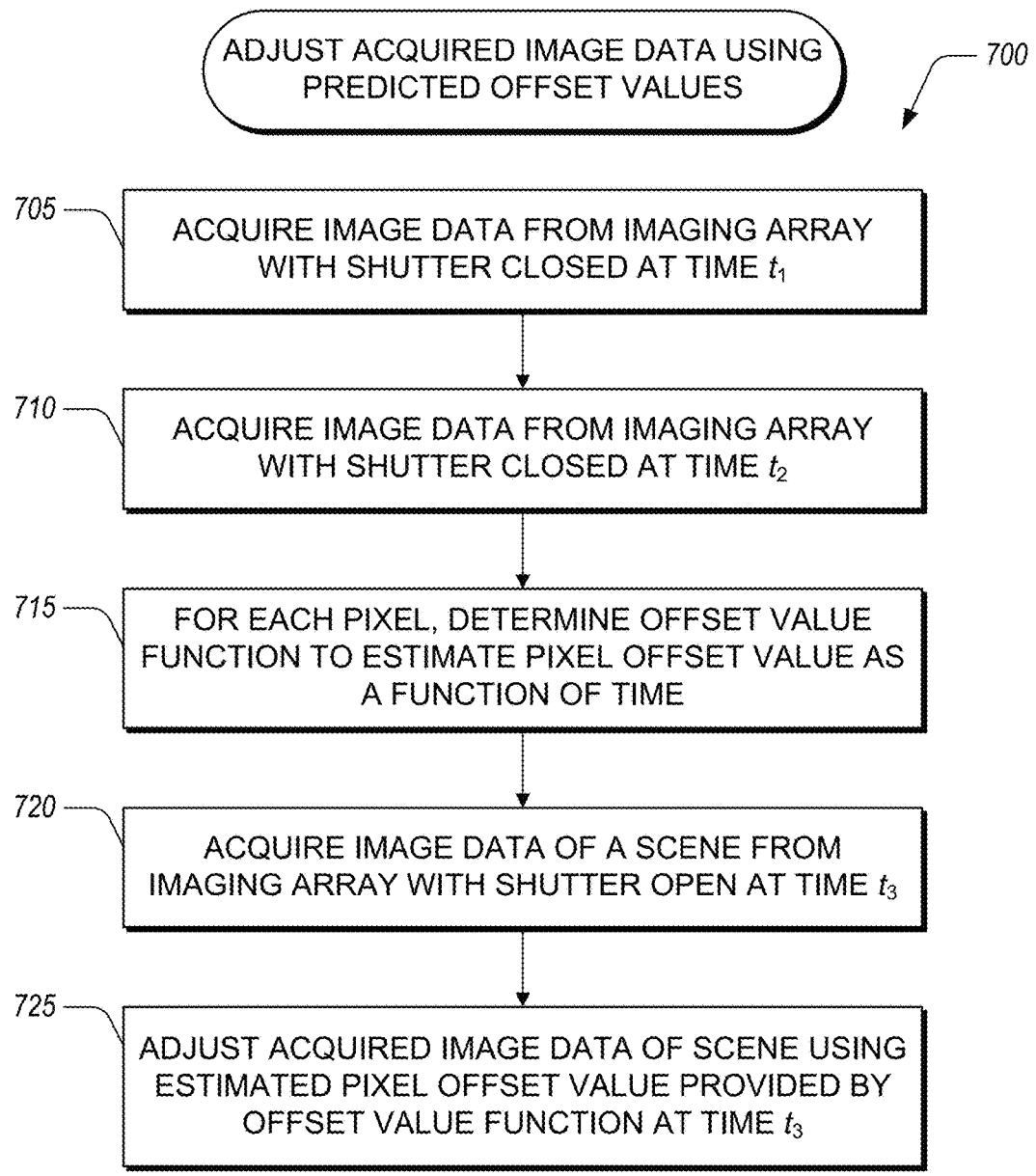
FIG. 7 illustrates a flow chart of an example method for adjusting an acquired image using predicted pixel offset values.

Example Method for Adjusting an Acquired Image Using Predicted Pixel Offset Values FIG. 7 illustrates a flow chart of an example method 700 for adjusting an acquired image using predicted pixel offset values. The method 700 can be implemented using one or more hardware components in an imaging system or image processing system. For ease of description, the method 700 will be described as being performed by the imaging system 100 described herein with reference to FIGS. 1A and 1B. However, one or more of the steps of the method 700 can be performed by any module or combination of modules in the imaging system 100. Similarly, any individual step can be performed by a combination of modules in the imaging system 100.

In block 705, the imaging system acquires image data from an imaging array with a shutter occluding the imaging array at a first time, $t_1$. The flat field data acquired at the first time can be stored in a permanent or temporary data storage. In block 710, the imaging system acquires image data from the imaging array with the shutter occluding the imaging array at a second time after the first time, $t_2 > t_1$. The flat field data acquired at the second time can also be stored in a permanent or temporary data storage. In some embodiments, the first flat field data (or the flat field data acquired at the first time) and the second, flat, field data (or the flat field data acquired at the second time) can be discarded after an offset value function is determined in block 715 below.

In block 715, the imaging system determines, for individual pixels, an offset value function configured to determine an estimate of an offset value of the individual pixel at a later time, $I_{c,i}(t)$, by fitting an equation to first flat field pixel values, $I_{1,i}$, and second flat field pixel values, $I_{2,i}$. The offset value function can represent, in some embodiments, deviation from a uniform response for individual pixels. The uniform response can be calculated based on an average pixel value for a particular flat field image, a maximum value, a minimum value, a median value, or another statistical calculation. For an individual pixel, the offset value function can be configured to characterize a pixel's deviation from the flat field response, however defined, as a function of time. This deviation from the flat field response can be normalized, in some embodiments. For example, it can be normalized to the flat field response value. The offset value function can be a linear function of time. The offset value function can be a quadratic function of time. The offset value function can be determined using Lagrangian interpolation techniques. Other non-linear functions can be used as well to represent the offset value as a function of time.

In block 720, the imaging system acquires image data of a scene from the imaging array with the shutter exposing the imaging array at a third time after the second time, $t_3 > t_2$. In block 725, the imaging system adjusts the acquired image data of the scene using the offset value function. The adjusted pixel values of the image data, $I_{a,i}$, can be the acquired image data of the scene, $I_i$, adjusted using the estimated offset value, $I_{c,i}$, estimated at the acquisition time, $t_3$, $I_{c,i}(t_3)$.

In some embodiments, the offset value function can be updated at times later than the third time by acquiring additional flat field data and updating the fit to the acquired data points. In certain implementations, the shutter is closed periodically at a first frequency (e.g., once every 30 frames) during a startup phase of the imaging system and closed periodically at a second frequency (e.g., once every 5 minutes) slower than the first rate after the startup phase.

The present disclosure provides for a function that does not require temperature as an input to determine offset corrections that can be frequently updated during a warm up phase and infrequently updated thereafter. This can balance targeted operational parameters such as accuracy of predicted offset correction values and infrequency of shutter closures. Such an offset correction may be used independently for systems with no temperature sensing or unreliable temperature sensing, or it can be employed with or as an adjunct to temperature-based methods. The systems and methods provide an extrapolation of offset values for times later than the latest update to the predictive offset value function. The disclosed systems and methods can also be configured to store, image frames for later display or analysis such that offset correction values can be determined at a later time during image processing. In some embodiments, the offset value functions can be determined and used to extrapolate correction values backwards in time. In some embodiments, the offset value functions can be used to provide offset correction for data acquired earlier than the points used in determining the functions.

Figure 8:
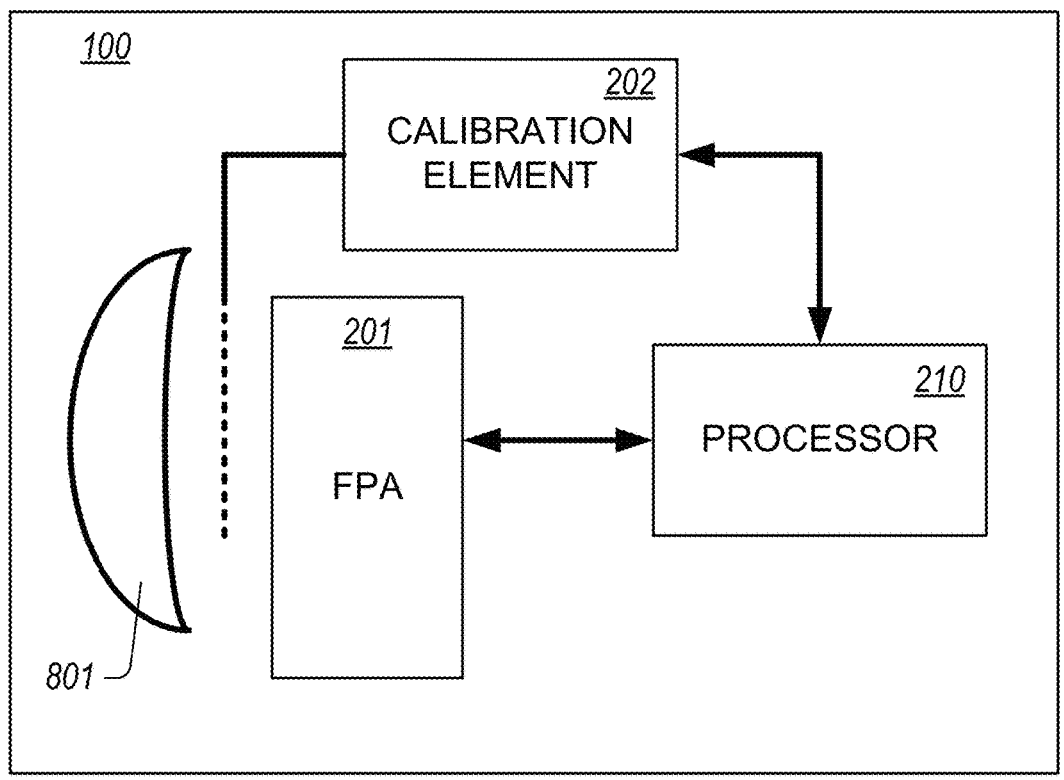
FIG. 8 illustrates a functional block diagram of elements of calibration control of an example imaging system.

Example Imaging System Configured to Adaptively Actuate a Calibration Element and Use Thereof Referring to FIG. 8, basic elements of an example imaging system front end or camera core 100 are shown. Optical element(s) 801 gather light onto Focal Plane Array (FPA) 201. For thermal imaging systems and other systems whose non-uniformity may vary with time, calibration element 202 may be present to present a known scene using an in-use calibration element as described above, as well as for other uses. Processor 210, whose functionality may in fact be distributed over one or more hardware entities, or even cloud-based entities, may perform several functions. For purposes of the present disclosure, processor 210 is configured to control and acquire data from the FPA 201 to actuate calibration element 202, and to be responsible for some or all of the processing and display chain described in FIGS. 1A and 1B.

Figure 9:
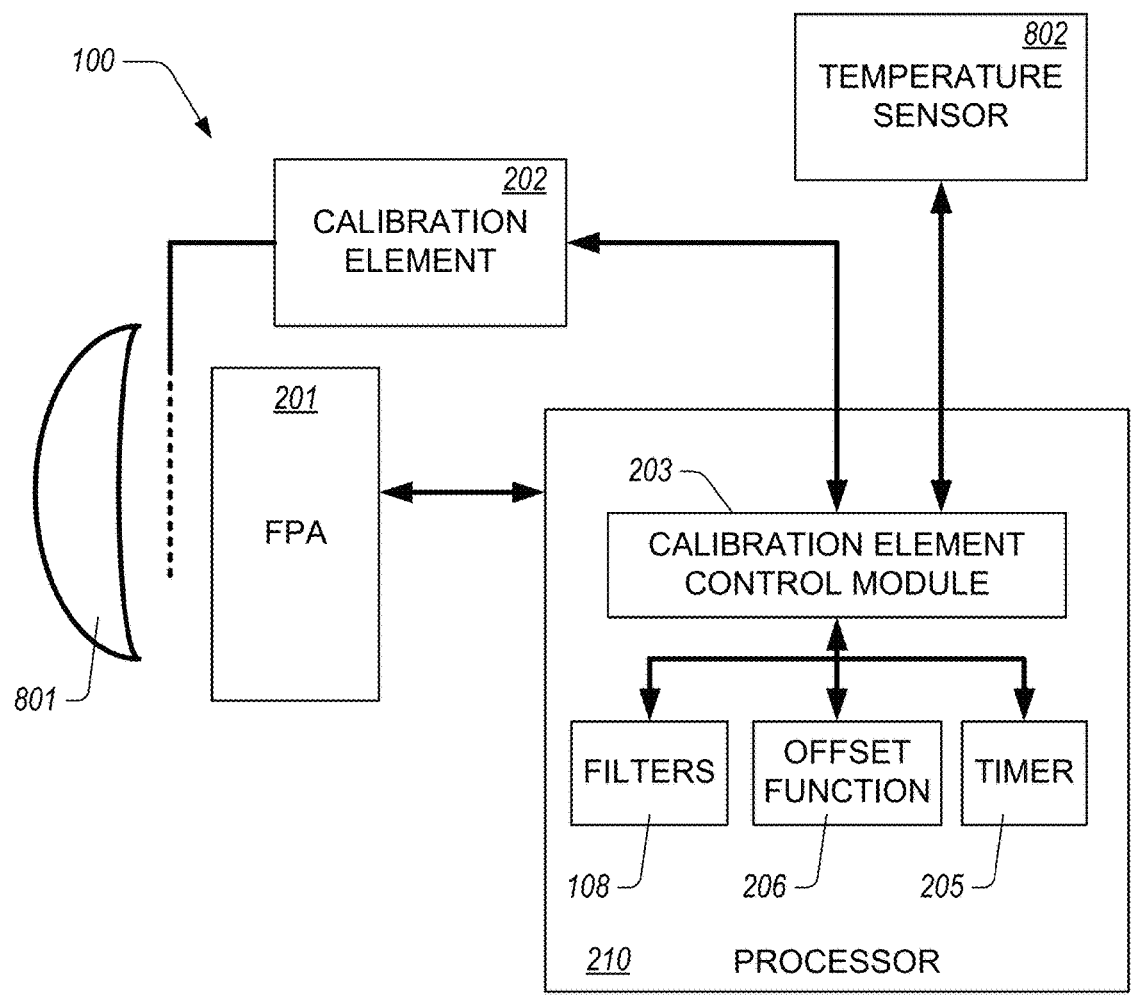
FIG. 9 illustrates a functional block diagram of elements of the processor and calibration control of an example imaging system.

FIG. 9 illustrates elements either part of or connected to processor 201 which may be used to implement adaptive calibration control. Any one of these elements may suffice, or some combination may be utilized, so it is understood that not all elements shown need be present to implement adaptive calibration control, while elements not shown may be suitable and still fall within the scope of the presently disclosed embodiments and corresponding claims.

As described above for the case where a shutter is the calibration element, closing the shutter 202 allows processor 210 to acquire flat field image data. The processor 201 may use the acquired flat field image data to update the NUC. Other calibration elements may be employed and any scene that is known, e.g., a target with a known pixel to pixel pattern, may be used to generate a NUC, For most thermal imaging systems, particularly for less-expensive, mass-produced thermal imaging systems, as well as other classes of imaging system, drift in photodetector responsivity, noise characteristics, and signal offset typically drift over time, due to varying environmental conditions, both in absolute terms and perhaps more importantly relative to other photodetectors in the FPA. It is therefore advantageous to update the NUC on occasion for these kinds of imaging systems. If the NUC is not updated or updated infrequently, unacceptable image degradation may occur. NUC techniques that do not rely on actual physical calibration elements exist, but using a physical calibration element, such as a shutter, to produce a known image, such as a flat field image, is an effective technique that provides advantages over NUC techniques that do not rely on physical calibration elements. However, frequently or unnecessarily actuating a physical calibration element may be disadvantageous. For instance, closing a shutter interrupts imaging, makes audible noise, uses power, and causes mechanical wear, among other issues.

If the rate of change of the NUC is low (e.g., within a targeted or pre-determined range), the in-use calibration routines or processes may take place less frequently. The NUC may change for a variety of reasons. One significant contribution to NUC change for thermal imaging systems, and in particular systems whose photodetectors are microbolometers, is change in operating temperature of the FPA. This is due at least in part to the fact that microbolometers are inherently temperature sensors, and their sensitivity to thermal radiation is due to radiation induced heating, the effect of which on signal change is usually less, and in some cases much less, than the change in microbolometer signal due to operating temperature drift. Much of the art in making workable thermal imagers is directed to extracting the relatively small signals due to captured radiation from the larger signals due to operating temperature drift. However, even well-designed thermal imaging systems benefit from updating the NUC. Information related to the rate of change of the NUC can be directly measured or indirectly derived from image data. Gathering this information, determining either in real time or through testing its relationship to the rate of change of the NUC, and controlling actuation of a calibration element accordingly can lead to a reduction of in-use calibration events with little or no loss of image quality.

Referring to FIG. 9, some sources of NUC-related information will be discussed. One of the strongest effects on NUC is temperature drift of the imaging array and its surrounding structure. Temperature change or drift may be due to many sources. The FPA operating temperature may change rapidly in the moments after the system is powered up. It may also change rapidly or slowly depending on ambient temperature effects. For instance, moving a system from indoors to outdoors or the opposite may cause a rapid change, while longer term changes in ambient temperature or handling may clause slower drifts. Thus, if the operating temperature of the FPA 201 is known, predicting the rate of change of the NUC due to temperature may be accomplished. If the system has on onboard or other suitably placed temperature sensor 802, the relationship between the temperature sensor reading and the temperature of the FPA detector may be determined or calibrated. In this way, temperature changes, and rates of changes, may be measured directly or calculated. For systems without dedicated temperature sensors, it may be possible to measure changes in operating temperatures of the FPA 201. Many microbolometer FPAs have blocked detectors that are used as temperature offset correctors in the readout circuitry. If a blocked detector is paired in a balanced differential circuit with an identical unblocked detector, the circuit output should be due to radiation induced signal on the unblocked detector. Such techniques work well but slight variations in manufacturing uniformity across the arrays still lead to the need to perform an NUC from time to time. However, the shield that blocks the detector is physically part of the FPA. So both the blocked detector and the shield are at or near the operating temperature of the FPA. Thus, the signal across the blocked detector is directly due to FPA operating temperature. Even if the blocked detector signal may not be correlatable to actual operating temperature, differences in blocked detector signal will be at least partially representative of operating temperature differences over time.

Rules may be determined at system calibration, or may be empirically based, for correlating the absolute value of the operating temperature and/or rate of change of the operating temperature with the rate of change of the NUC. These rules may be programmed into the calibration element control module 203 of processor 210. The calibration events (e.g., acquisition of image data with the calibration element 202 activated) may be at least partially controlled by temperature data measured by a sensor 802, or derived from the FPA itself, such as through monitoring the voltage across a blocked detector. Thus, for systems capable of providing a direct measure of operating temperature, one cause for the rate of change of the NUC is measurable and usable for adaptive shutter control.

Another factor affecting the rate of change of the NUC is the amount of time after an event that tend to cause rapid changes in the NUC. As described above, these events may be due at least in part to changes in operating temperature, but even for systems with no direct measurement of temperature, elapsed time may provide guidance for the rate of change of the NUC. Most processors have some type of timer 205, such as a real time internal clock or the like. Certain events that induce a change in the NUC may be directly observable by the processor 210, such as system power up or user-induced changes in mode of operation. Other events may be inferable from observing the NUC itself. For instance, if over the course of a few shutter-closed cycles, the average, median or other bulk change in offset values across the photodetector array undergo a relatively large shift, it is likely that the system was exposed to a rapid change in operating temperature. For these types of events, the rate of change of the NUC may be rapid soon after the event but may settle down as time passes. Rules can be developed at system calibration, or may be empirically based, to predict how long after an event such as power up or rapid shift in NUC, the change in the NUC settles down. A profile of the settling time of the NUC after certain types of events may be developed. Using input from timer 205, the calibration element control module 203 may be programmed to adaptively control actuations of the calibration element 202 based at least in part on this developed profile. It also may be desirable to perform an updated NUC if an image is going to be saved as well as displayed, as image quality is usually improved immediately after updating a NUC.

Image data may also be used to predict the rate of change of the NUC. This may be accomplished derivationally without external measurements or inputs such as time or temperature. Filters 108 in the image processing chain, described above with reference to FIGS. 1A and 1B, typically operate by dividing image data into kernels and looking at local differences within the kernel such as center pixel or groups of pixels to nearest neighbor differences, pixel or group of pixels versus kernel average, median and the like, and other kernel operations which identify local pixel to pixel variations. Array-wide statistics on these differences acquired from scene image data or from shutter closed, flat, field data may provide a measure of how the array is performing as a whole and the rate of change of the filter outputs may correlate directly with the rate of change of the NUC. For example, a filter operation can break a frame or sub-frame into a plurality of kernels. The filter operation can determine a result for each kernel. A subset of these results can be aggregated to determine a filter operation result or value. Aggregation of kernel results can include any statistical determination or calculation including, but not limited to, calculating an average of the kernel results, determining a median value, determining a middle value, determining a high value, determining a low value, etc. This value can be correlated with the rate of change of the NUC. Accordingly, if the filter operation value is outside of a targeted range or exceeds a targeted threshold, a calibration event can be initiated or scheduled. This may be advantageous as the result of the filter operation may not depend on measurements of temperature. Thus, such embodiments can be employed on imaging systems that do not include temperature sensors. Similarly, filter module statistics may be monitored during scene imaging (e.g., imaging with the calibration element de-actuated or disengaged) and these statistics can be compared to pre-determined thresholds that adaptively lead to a decision to actuate the calibration element (e.g., close the shutter) where the decision does not depend directly on external sensor measurements or input from a timer.

Figure 10A:
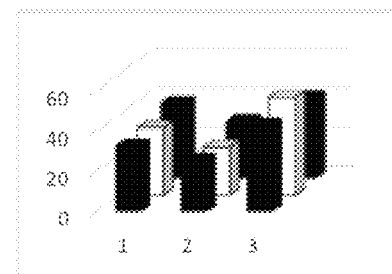
FIGS. 10A, 10B, 10C, and 10D illustrate an example of deriving information correlated to the rate of change of the NUC using filter operations.
Figure 10B:
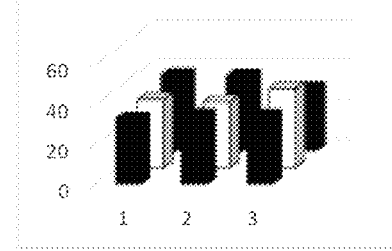
Figure 10C:
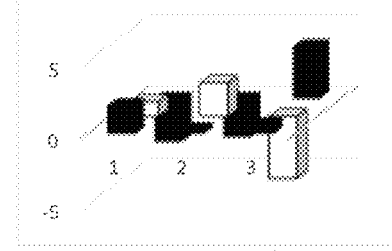
Figure 10D:
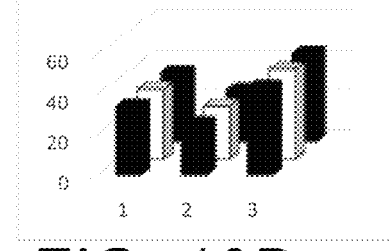

FIGS. 10A-10D illustrate how a noise filter operation, e.g., one that may be performed routinely on all or many image frames as a matter of course, may be used to predict a change in NUC. An example kernel A1 is shown in FIG. 10A with example pixel values as acquired from the imaging array for the corresponding pixel locations. The standard deviation of the example pixel values is 8. Also shown is B1 whose entries are the column averages and the offset of the second and third column averages to the column 1 average. In FIG. 10B, A2 is equal to A1 plus the column offsets from B1. This effectively suppresses the low frequency content of A1. The standard deviation of A2 is 3 and this standard deviation is a measure of the pixel-to-pixel noise variation. The rest of the filter operation is illustrated in FIG. 10C where the noise and flat field variations are determined and then applied in FIG. 10D. The standard deviation of A2 from FIG. 10B is a measure of pixel-to-pixel noise. If this number grows, it may be an indication that the NUC should be updated. This particular standard deviation may be saved from a number of kernels generated during the filter operation. For example, anywhere from 1 to all kernels may be saved, but desirably more than 10 or so. Rules may be set for thresholds and/or trends of the average, median, mid, or other measure of the chosen kernels as an indication of the rate of change of the NUC.

Another approach that is based on image data is to monitor the offset predictive function 206 described above. When the rate of change of the predictive function is able to be determined from the function itself, rules may be determined that set the rate of actuation of the calibration element 202 that are dependent on the rate of change of the predictive function. For example, the rate of change of the predictive function can be related to a derivative of the predictive function. In such example embodiments, a derivative of the function can be calculated and the value of the derivative can be determined at a particular time (e.g., the current time, the time of the next predicted calibration event, etc.) and/or an average of the derivative value can be determined over a range of times (e.g., since the last calibration event, the last 10 seconds, the last 5 seconds, a window that covers approximately 5% of the time between planned or calculated calibration events, a window that covers approximately 10% of the time between planned or calculated calibration events, a window that covers approximately 15% of the time between planned or calculated calibration events, etc.). In some embodiments, the predictive function is a linear function and the rate of change of the predictive function can be a constant value. In some embodiments, the rate of change of the predictive function can be determined based on the coefficients of the predictive function. If the value corresponding to the rate of change of the predictive function exceeds a threshold or falls outside of a targeted range, the rate of the actuation of the calibration element 202 can be modified (e.g., increased or decreased).

The various sources of information, both measured, input and derived from image data may be used separately or in combination. Combinations of data sources may be particularly advantageous. For example, the prediction or estimate of the rate of change of the NUC that is based on temperature measurements or calculations may not account for contributions to changes in the NUC that are not due to temperature. Such contributions may show up in the data derived information, for example. Other sources related to the rate of change of the NUC may be used as well in place of those discussed herein and/or in combination with the sources discussed herein.

Figure 11A:
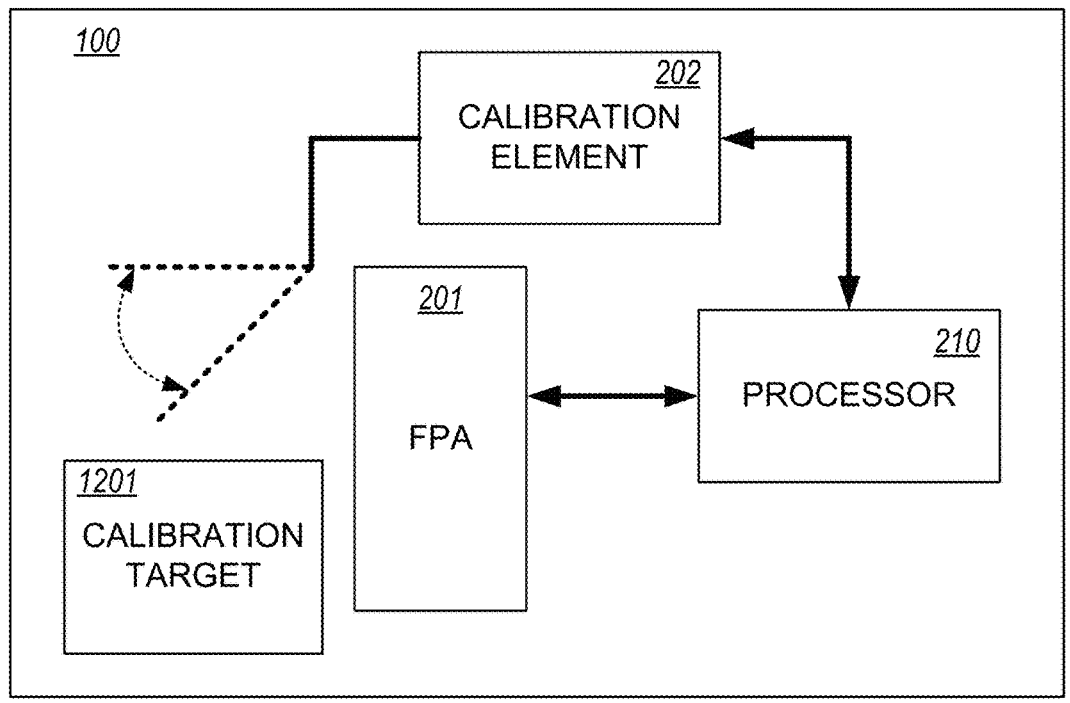
FIGS. 11A and 11B illustrate additional examples of calibration elements.
Figure 11B:
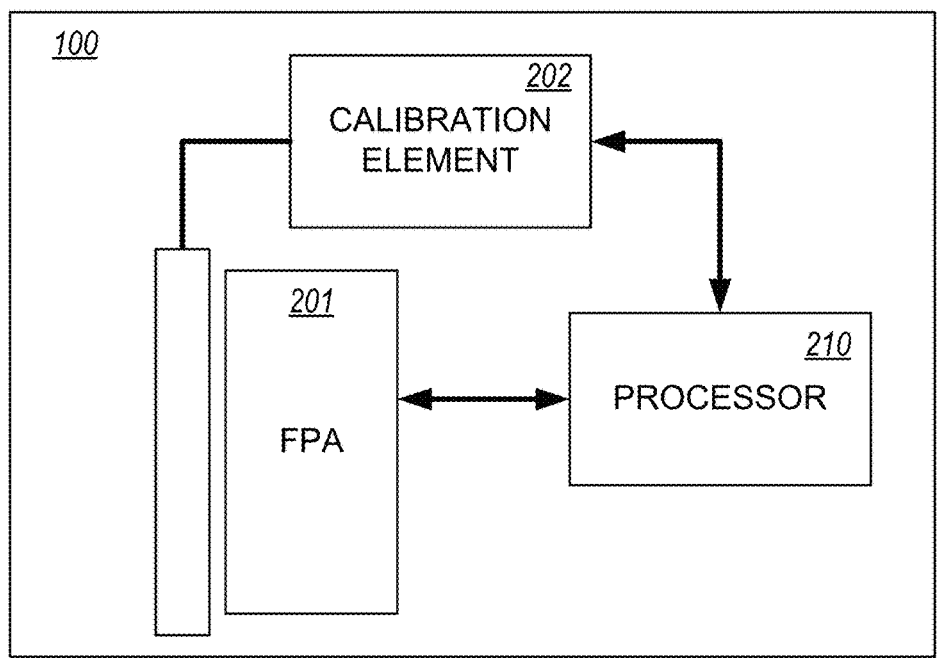

FIGS. 11A and 11B illustrate additional calibration elements other than a shutter. FIG. 11A illustrates calibration element 202 as a rotatable mirror, beamsplitter or other optical element(s) that in a deactivated position does not obscure the field of view of FPA 201 and in an actuated position presents a calibration target 1201 to the FPA 201. When in view, the calibration target 201 can be configured to present a known scene to fill all or at least part of the field of view of the FPA 201. The calibration target 201 may present a flat field scene, or it may present a known pattern of shapes and/or temperatures. FIG. 11B illustrates the calibration element 202 as an electronic aperture or shutter of a type whose transmissive characteristics may be varied by applying a control signal to the element.

Example Method to Adaptively Control a Shutter

Figure 12:
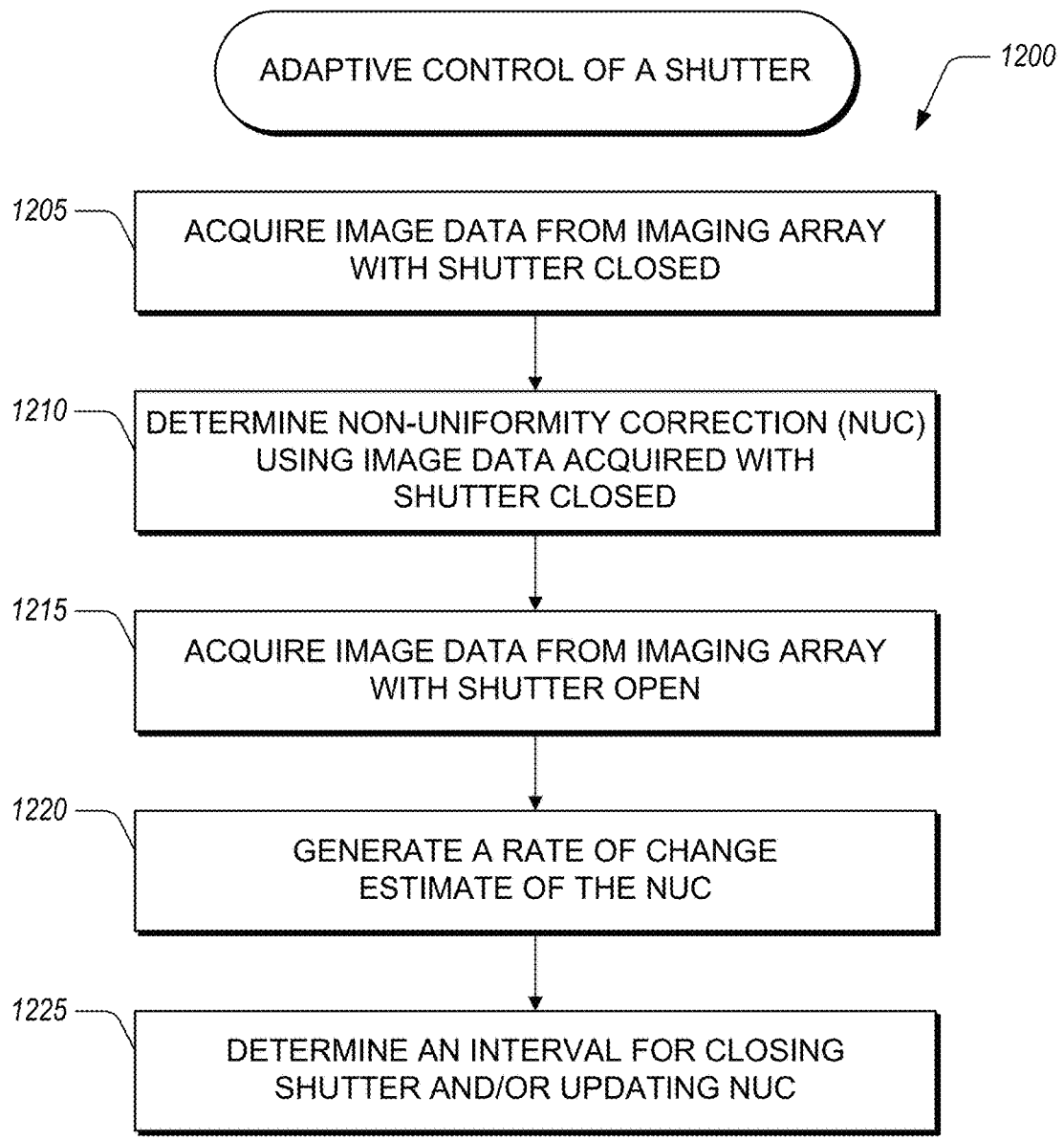
FIG. 12 illustrates a flow chart of an example method for adaptive control of a shutter of an imaging system.

FIG. 12 shows a flow chart of an example method 1200 for adaptive control of a calibration control in embodiments where the imaging system includes a shutter as the calibration element. In block 1205, the imaging system acquires image data with the shutter closed. The shutter can be closed at one or more times under processor control to occlude the array of photodetectors, and image data can be acquired from the array of photodetectors. The image data may include an array of pixel values representing a flat field scene of the shutter. For many thermal imaging systems in particular, physical shutters producing flat filed image data may be beneficial. In block 1210, the imaging system determines a non-uniformity correction (NUC) using the flat field scene image data. Such NUC is typically required for imaging systems, such as thermal imaging sensors, where the signal that is derived from radiation is a relatively small part of the signal output by the detectors and the relative weight of the signals derived from radiation and the offsets drift over time and between detectors in the array. In block 1215, image data is acquired at one or more times with the shutter open. This is step is the scene imaging part of the imaging system operation. The last developed NUC or predicted NUC is typically applied to each frame of image data acquired during scene imaging.

In block 1220, the imaging system generates an estimate of the rate of change of the NUC. This can be done by correlating information such as image data acquired with the shutter open, image data acquired with the shutter closed, elapsed time data, and/or FPA ambient condition data with an estimated rate of change of the NUC. As described above, rules and thresholds for the use of this data as it relates to the rate of change of the NUC may be determined. In block 1225, the interval (or next closing time) is determined for closing the shutter and/or updating the NUC based on the estimated rate of change of the NUC. For example, the interval can be determined such that the next calibration event (e.g., a sequence of events that result in an updated NUC) occurs at a time when the predicted NUC is less than a threshold amount away from the current NUC.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. For example, the LUT described herein may be implemented using a discrete memory chip, a portion of memory in a microprocessor, flash, EPROM, or other types of memory.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. A software module can comprise computer-executable instructions which cause a hardware processor to execute the computer-executable instructions.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to illustrative embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A method for adaptive calibration control in an imaging system comprising a calibration element, a Focal Plane Array (FPA) comprising an array of photodetectors, and detector electronic circuitry for reading out image data from the array of photodetectors, and one or more control processors, the method comprising:
- actuating the calibration element at one or more times under processor control to present a known scene to the array of photodetectors;
- acquiring image data from the array of photodetectors while the calibration is actuated, the image data comprising an array of pixel values representing the known scene;
- calculating a non-uniformity correction (NUC);
- acquiring image data at one or more times with the calibration element de-actuated;
- generating an estimated rate of change of the NUC based at least in part on one or more of calibration image data, scene image data, elapsed time data, or FPA ambient condition data;
- based at least in part on the estimated rate of change of the NUC, determining at least one of:
  - an interval for actuating the calibration element or a next calibration activation time, or
  - an interval for updating the NUC.

2. The method of claim 1, wherein the estimated rate of change of the NUC is based at least in part on a filter operation performed on image data.

3. The method of claim 2, wherein the filter operation comprises application of a high-pass filter or a Fixed Pattern Noise (FPN) filter, and the estimated rate of change of the NUC is based at least in part on a change in high spatial frequency noise over time.

4. The method of claim 1, wherein FPA ambient temperature information is determined by acquiring data from one or more of an FPA temperature sensor, an imaging system, temperature sensor whose output is related to FPA temperature, a known scene temperature sensor, or an imaging system temperature sensor sensing surrounding environment ambient temperature.

5. The method of claim 4, wherein the estimated rate of change of the NUC is based at least in part on one or more of the acquired temperature difference over time or the rate of change of the acquired temperature.

6. The method of claim 1 further comprising:
- generating a predictive function configured to predict the NUC, the predictive function based at least in part on the known scene data acquired at two or more calibration events, wherein a predicted NUC is applied to image data acquired during scene imaging events that are subsequent to the two or more calibration events used to develop the predictive function; and
- updating the predictive function based on subsequent calibration events,
- wherein the estimated rate of change of the NUC is based at least in part on properties of the predictive function.

7. The method of claim 6, wherein the estimated rate of change of the NUC is based at least in part on the rate of change of the predictive function.

8. The method of claim 1, wherein elapsed time is acquired from one or more of a real time clock or timer.

9. The method of claim 1, wherein the calibration element is a shutter and the known scene is the flat field scene observed by the FPA when the shutter is closed.

10. The method of claim 1, wherein the imaging system is a thermal imaging system.

11. An imaging system comprising:
- an imaging FPA comprising an infrared focal plane array;
- a calibration element configured to expose the FPA to a known scene when actuated; and
- one or more control processor elements including one or more of a signal processing element, a calibration element controller, a temperature acquisition element, and a timer element, the processor configured to:
  - actuate the calibration element at one or more times under processor control to present a known scene to the array of photodetectors;
  - acquire image data from the array of photodetectors, the image data comprising an array of pixel values representing the known scene;
  - determine a non-uniformity correction (NUC);
  - acquire image data at one or more times with the calibration element de-actuated;
  - generate an estimated rate of change of the NUC based at least in part on one or more of calibration image data, scene image data, elapsed time data, or FPA ambient condition data; and
  - determine, based at least in part on the estimated rate of change of the NUC, at least one of:
    - an interval for actuating calibration element or next calibration activation time; or
    - updating NUC based on the correlating information.

12. The system of claim 11, wherein the estimated rate of change of the NUC is based at least in part on a filter operation performed on image data.

13. The system of claim 12, wherein the filter operation comprises application of a high-pass filter or a Fixed Pattern Noise (FPN) filter, and the estimated rate of change of the NUC is based at least in part on a change in high spatial frequency noise over time.

14. The system of claim 11, wherein FPA ambient temperature information is determined by acquiring data from one or more of an FPA temperature sensor, an imaging system temperature sensor whose output is related to FPA temperature, a known scene temperature sensor, or an imaging system temperature sensor sensing surrounding environment ambient temperature.

15. The system of claim 14, wherein the estimated rate of change of the NUC is based at least in part on one or more of the acquired temperature difference over time or the rate of change of the acquired temperature.

16. The system of claim 11, wherein the processor is further configured to:
- generate a predictive function configured to predict the NUC, the predictive function based at least in part on the known scene data acquired at two or more calibration events, wherein a predicted NUC is applied to image data acquired during scene imaging events that are subsequent to the two or more calibration events used to develop the predictive function; and
- update the predictive function based on subsequent calibration events,
- wherein the estimated rate of change of the NUC is based at least in part on properties of the predictive function.

17. The system of claim 16, wherein the estimated rate of change of the NUC is based at least in part on the rate of change of the predictive function.

18. The system of claim 11, wherein elapsed time is acquired from one or more of a real time clock or timer.

19. The system of claim 11, wherein the calibration element is a shutter and the known scene is the flat field scene observed by the FPA when the shutter is closed.

20. The system of claim 11, wherein the imaging system is a thermal imaging system.

* * * * *

UNITED STATES PATENT AND TRADEMARK OFFICE
CERTIFICATE OF CORRECTION

PATENT NO. : 9,924,116 B2
APPLICATION NO. : 15/068405
DATED : March 20, 2018
INVENTOR(S) : Romeo Chahine It is certified that error appears in the above-identified patent and that said Letters Patent is hereby corrected as shown below:

On the Title Page

Item (72) Inventor, Line 3, change "Jeffery Lee" to --Jeffrey Lee--

In the Specification

In Column 2, Line 17, change "NUC" to --NUC.--

In Column 3, Line 4, change "Nona Uniformity" to --Non-Uniformity--

In Column 16, Lines 52-53, change "uniform'response" to --uniform response--

Signed and Sealed this
Twenty-second Day of January, 2019

Andrei Iancu
*Director of the United States Patent and Trademark Office*